(12) United States Patent
Frankel et al.

(10) Patent No.: US 9,470,908 B1
(45) Date of Patent: Oct. 18, 2016

(54) ADAPTABLE LOUPE SUPPORTING EYEWEAR

(71) Applicants: Jeffrey Frankel, Boca Raton, FL (US); Jason Andre' Eulette, Sunrise, FL (US)

(72) Inventors: Jeffrey Frankel, Boca Raton, FL (US); Jason Andre' Eulette, Sunrise, FL (US)

(*) Notice: Subject to any disclaimer, the term of this patent is extended or adjusted under 35 U.S.C. 154(b) by 0 days.

(21) Appl. No.: 14/536,195

(22) Filed: Nov. 7, 2014

Related U.S. Application Data

(60) Provisional application No. 62/051,939, filed on Sep. 17, 2014, provisional application No. 61/901,937, filed on Nov. 8, 2013.

(51) Int. Cl.
| | |
|---|---|
| *G02C 1/00* | (2006.01) |
| *G02C 7/08* | (2006.01) |
| *G02C 11/04* | (2006.01) |
| *G02C 11/00* | (2006.01) |
| *G02B 7/00* | (2006.01) |

(52) U.S. Cl.
CPC .............. *G02C 7/086* (2013.01); *G02C 11/04* (2013.01); *G02C 11/10* (2013.01); *G02B 7/002* (2013.01)

(58) Field of Classification Search
CPC ............ G02C 1/06; G02C 1/10; G02C 5/04; G02C 5/045; G02C 5/122; G02C 5/124; G02C 7/02; G02C 7/08; G02C 7/081; G02C 7/086; G02C 7/088; G02C 9/00; G02C 11/04; G02C 2200/06; G02C 2200/08
USPC ............ 351/41, 83, 86, 118, 128, 137, 140, 351/158; 359/407
See application file for complete search history.

(56) References Cited

U.S. PATENT DOCUMENTS

| | | | |
|---|---|---|---|
| 3,610,743 A | * 10/1971 | Lindblom | G02C 5/045 351/107 |
| 4,429,959 A | 2/1984 | Walters | |
| 4,676,609 A | 6/1987 | Matsui | |
| 6,061,189 A | 5/2000 | Caplan | |
| 6,201,640 B1 | 3/2001 | Caplan | |
| 6,493,136 B2 | 12/2002 | Chang | |
| 6,513,929 B2 | 2/2003 | Chang | |
| 6,661,833 B1 | 12/2003 | Black | |
| 6,667,832 B2 | 12/2003 | Caplan | |
| 6,704,142 B2 | 3/2004 | Caplan | |
| 7,072,124 B2 | 7/2006 | Wilt | |
| 1,891,808 A1 | 2/2011 | Mazurenko | |
| 8,045,266 B2 | * 10/2011 | Nakamura | G02B 7/002 359/410 |
| 8,120,847 B2 | * 2/2012 | Chang | G02C 7/088 351/204 |
| 8,305,685 B2 | 11/2012 | Heine | |

(Continued)

*Primary Examiner* — Huy K Mai
(74) *Attorney, Agent, or Firm* — Allen D. Hertz, P.A.; Allen D. Hertz

(57) ABSTRACT

Eyewear comprising a pair of lenses assembled to a frame. Each lens comprises an integral tubular loupe mounting bracket extending forward of the lens exterior surface. The tubular mounting bracket defines an interior surface. The interior surface provides a loupe coupling receptacle for receiving and temporarily retaining a loupe assembly therein, enabling replacement of each loupe for repair, change in magnification, reduction in overall costs, reduced delivery time, etc. The loupe assembly is temporarily fixed within the loupe coupling receptacle by a loupe retention element feature. The lenses can be manufactured of a generally planar or curved shaped clear, translucent, or opaque material. The lenses can be adjustably assembled to the frame, enabling adjustable positioning of each loupe. Accessories, such as a camera, lighting, a secondary lens frame (such as prescription lenses), etc. can be integrated or removably attached to the eyewear frame.

20 Claims, 30 Drawing Sheets

(56) References Cited

U.S. PATENT DOCUMENTS

| | | | |
|---|---|---|---|
| 2001/0046028 A1* | 11/2001 | Barrows | A61F 9/022 351/48 |
| 2004/0017539 A1* | 1/2004 | Nagata | G02B 7/002 351/57 |
| 2004/0125444 A1 | 7/2004 | Caplan | |
| 2006/0245052 A1 | 11/2006 | Wilt | |
| 2009/0066906 A1* | 3/2009 | Huang | G02C 9/00 351/44 |
| 2010/0053540 A1 | 3/2010 | Blayden | |
| 2012/0120636 A1 | 5/2012 | Wilt | |
| 2012/0250145 A1* | 10/2012 | Feinbloom | G02B 25/004 359/361 |
| 2014/0036356 A1 | 2/2014 | Feinbloom | |
| 2014/0313121 A1* | 10/2014 | Lee | G06F 3/0304 345/156 |

* cited by examiner

ADAPTABLE LOUPE SUPPORTING EYEWEAR

CROSS-REFERENCE TO RELATED APPLICATIONS

This Application is a Non-Provisional Patent Application claiming the benefit of U.S. Provisional Patent Application Ser. No. 62/051,939, filed on Sep. 17, 2014 and U.S. Provisional Patent Application Ser. No. 61/901,937, filed on Nov. 8, 2013, both of which are incorporated by reference herein.

FIELD OF THE INVENTION

The present disclosure generally relates to eyewear supporting a pair of loupes. More particularly, the present disclosure relates to eyewear comprising a pair of removable and exchangeable loupe subassemblies, wherein the removability and exchangeability introduces a number of advantages, including flexibility of the magnification between exchanged loupes, a reduced cost to the user, and the like.

BACKGROUND OF THE INVENTION

Loupes are added to eyewear providing a magnified view of an image to a user. Each loupes is permanently affixed to a supporting lens. Each person eyes are located at different positions on the individual's face. Each loupe must be positioned in proper registration with each respective eye of the user for optimized use. Currently, eyewear is custom configured to properly locate each loupe in the respective lens at a location determined to align with eyes of the specific end user The current offerings present a number of limitations. The process for custom fabricating each eyewear is a time consuming and costly process. The end user must provide data to the loupe eyewear manufacturer in order for the manufacturer to determine the proper location for mounting each loupe to each respective lens. The cost of each loupe eyewear can impact decisions regarding procurement of a second or spare eyewear. Each loupe is adhesively bonded to the lens limiting the options for repair or replacement of a damaged loupe, lens, or both.

Therefore, what is needed is a mechanical loupe attachment design enabling easy attachment and replacement of the loupe respective to the lens. The eyewear could be further enhanced by integrating flexibility into the design of the eyewear enabling a technician, the end user, and the like to properly position each loupe for the specific end user.

SUMMARY OF THE INVENTION

The present disclosure is generally directed towards a loupe design and respective eyewear design enabling flexibility for properly locating each loupe respective to the location of the eyes of the end user.

One aspect of the present invention is a loupe design comprising:
 a optical barrel subassembly comprising:
 a loupe barrel body having a tubular structure extending between a loupe object lens end and an eyewear attachment end,
 a loupe object lens assembled to the loupe barrel body at the loupe object lens end,
 a loupe eyepiece lens assembled to the loupe barrel body at the eyewear attachment end, and
 a compression ring shaped coupling provided about an exterior circumference of the loupe barrel body proximate the eyewear attachment end; and
 a compression applying assembly ring assembly comprising:
 a compression applying assembly ring having a tubular structure comprising a compression applying loupe assembly ring inner surface designed to engage with the compression ring shaped coupling and apply a compression force thereon when snuggly attached to a lens of an eyewear and a fastener feature formed at a lens assembly end, and
 an assembly ring fastener having a mating fastener feature for mechanically engaging with the compression applying assembly ring fastener feature,
 wherein the compression ring shaped coupling enables a swiveling or omni-directional motion of the loupe barrel body for positioning the loupe barrel body and the loupe barrel body is retained in position when the assembly ring fastener applies an axial tensile force to the compression applying assembly ring.

In yet another aspect, the compression applying loupe assembly ring inner surface has a concave surface.

In yet another aspect, the fastener feature and mating fastener feature are threaded circular surfaces.

In yet another aspect, a gasket is installed between the assembly ring fastener and the respective lens. In one embodiment, the gasket can be an o-ring. The gasket can be employed to dampen motion between the lens and the loupe, decrease risk of damage to the lens, and the like.

In yet another aspect, the loupe barrel body is segmented into an object lens barrel and an eyepiece lens barrel, wherein the object lens barrel and the eyepiece lens barrel are telescoping respective to one another enabling a change in magnification provided by the loupe and/or enabling individual focusing of each loupe. The telescoping motion changes the distance between the object lens and the eyepiece lens.

In yet another aspect, the object lens barrel and the eyepiece lens barrel assembly can include a protrusion and a slot, wherein the slot is diagonally oriented about a portion of a circumference of the respective barrel. The position of the protrusion within the barrel governs a telescoping length of the assembly.

In yet another aspect, the segmented barrel body can enable separation of the object lens barrel and the eyepiece lens barrel from one another. In one embodiment, the protrusion can be provided on a cantilever enabling the protrusion to be pushed in a manner to clear the slot.

In yet another aspect, the compression applying assembly ring further comprises at least one loupe assembly ring axial retention feature, wherein the loupe assembly ring axial retention feature retains the compression applying assembly ring in an axial direction against the tensile force generated between the assembly ring fastener and the compression applying assembly ring When installed, the loupe design can be attached to eyewear, wherein the eyewear comprises:
 a primary frame element comprising a lens attachment segment extending generally outward from each side of a frame bridge segment terminating at a hinge section;
 a temple hingeably assembled to the a primary frame element hinge section;
 a pair of lenses, each lens being attached to a respective lens attachment segment of the primary frame element; and a width adjusting feature, wherein the width adjusting feature extends and retracts a span between the pair of lenses.

In another aspect, the width adjustment feature is integrated into the frame bridge segment of the primary frame element.

In another aspect, the width adjustment feature is a telescoping feature integrated into the frame bridge segment of the primary frame element. The telescoping feature can further comprise a retention element to retain the telescoping feature at a fixed length.

In another aspect, the retention element can be a threaded element, wherein the threaded element applies a compressive force generally perpendicular to a telescoping motion of the telescoping assembly.

In another aspect, the width adjustment feature is integrated into the lens attachment segment of the primary frame element.

In another aspect, the width adjustment feature is provided between the lens attachment segment of the primary frame element and each respective lens.

In another aspect, the width adjustment feature can incorporate a projection extending into an elongated slot. The slot enables one object to translate respective to the second object along a length of the slot. In one variant, the slot is provided through the lens and the projection extends generally perpendicularly from the primary frame element.

In yet another aspect, each eyewear lens is adjustably positioned using an eyewear lens positioning feature, wherein the eyewear lens positioning feature which restricts the adjustability of each eyewear lens to a generally transverse direction extending between a nasal side of the associated lens rim and a temple side of the associated lens rim.

In yet another aspect, each eyewear lens is adjustably positioned using an eyewear lens positioning feature, wherein the eyewear lens positioning feature comprises a slot and protrusion combination, wherein one of the slot and protrusion is integrated into the eyewear lens and the other of the slot and protrusion is integrated into the lens rim, and
    wherein when assembled, the protrusion is inserted through the slot.

In yet another aspect, the each eyewear lens positioning feature comprises a slot and protrusion,
    wherein the slot is defined by a major dimension and a minor dimension wherein the major dimension is larger than the minor dimension,
    wherein each protrusion extends across the minor direction and each protrusion has a dimension in the major direction that is smaller than the major dimension,
    wherein the geometry restricts motion of the protrusion within the slot along the minor dimension of the slot, while enabling adjustability of the position of the protrusion within the slot along the major dimension of the slot.

In yet another aspect, the width adjustment feature further comprises a recess within the primary frame element for receiving a portion of a peripheral edge of the lens.

In yet another aspect, the eyewear further comprises a vertical adjustment feature, wherein the vertical alignment feature vertically positions a pair of nose pads.

In yet another aspect, the vertical adjustment feature further comprises a nose pad frame that vertically translates respective to the frame bridge segment.

In another aspect, the vertical adjustment feature can incorporate a projection extending into an elongated slot. The slot enables one object to translate respective to the second object along a length of the slot. In one variant, the slot is provided through a nose pad frame attachment segment of the adjustable nose pad support frame and the projection extends generally perpendicularly from the frame bridge segment.

In another variant, the slot is provided through a nose pad location adjustment segment located at a distal end of a nose pad frame downward extending segment of the adjustable nose pad support frame and the projection extends generally outward from each nose pad.

In yet another aspect, the vertical adjustment feature further comprises a recess within the frame bridge segment for receiving at least a portion of the nose pad frame attachment segment.

In yet another aspect, temple further comprises an axial adjustment feature.

In another aspect, the temple axial adjustment feature is a telescoping feature integrated into the temple. The telescoping feature can further comprise a retention element to retain the telescoping feature at a fixed length.

In yet another aspect, the eyewear can further comprise a camera.

In yet another aspect, the camera is assembled to a camera mounting frame comprising an attachment bracket located at each end of a superstructure. The bracket is removably attached to each end piece of the eyewear frame.

In yet another aspect, the camera is pivotally assembled to the camera mounting frame.

In yet another aspect, the camera is retained in a pivotal position by at least one retention element.

In yet another aspect, the camera accessory further comprises at least one light emitting device.

In yet another aspect, the camera accessory further comprises at least one of a camera and a light emitting device assembled to the eyewear frame.

In yet another aspect, the camera is a digital camera.

In yet another aspect, the camera accessory further comprises a wireless communication interface.

In yet another aspect, the camera mounting frame further comprises a telescoping element.

In another embodiment, the present invention is an eyewear loupe assembly comprising:
    a pair of loupes, each loupe comprising a loupe barrel and a pair of series of lenses to magnified an image of an object, the loupe barrel having a tubular structure defining a lens supporting interior and an exterior surface, the exterior surface including a loupe coupling tube, wherein the each series of lenses are carried by the lens supporting interior of each respective loupe,
    eyewear comprising a pair of lens rims joined together by a frame bridge;
    a pair of lenses, each lens carried by a respective lens rim of the pair of lens rims, each lens including a tubular loupe mounting bracket extending angularly forward therefrom, the tubular loupe mounting bracket having an interior wall defining a loupe coupling receptacle wherein the loupe coupling receptacle is arranged to properly align each loupe with an associated eye of a user; and
    wherein the loupe coupling tube is slideably inserted into and retained within the loupe coupling receptacle.

In another aspect, the loupe coupling tube is retained within the loupe coupling receptacle by a loupe barrel retention element feature. In a first version, the loupe barrel retention element feature employs a threaded set screw passing through a threaded bore. In a second version, the loupe barrel retention element feature can include a series of compression assembly components. It is understood that any retention system can be employed to retain the loupe coupling tube within the loupe coupling receptacle.

In yet another aspect, each lens can be formed having an arched shape.

In yet another aspect, each lens can be formed having an arched shape, wherein the arch is formed in the eyewear lens extending the eyewear lens at least partially rearward as the eyewear lens approaches each temple.

In yet another aspect, each lens is a non-corrective lens shape.

In yet another aspect, each lens can be manufactured of a transparent material.

In yet another aspect, each lens can be manufactured of a translucent material.

In yet another aspect, each lens can be manufactured of an opaque material.

In yet another aspect, each lens can be removably assembled to the respective lens rim.

In yet another aspect, the lens frame assembly further comprises a secondary eyewear subassembly receiving featuring for receiving and retaining a secondary or prescription eyewear subassembly. The assembly of the secondary or prescription eyewear subassembly to the lens frame assembly can be temporary or permanent. The secondary or prescription eyewear subassembly would be positioned on an interior side of the lens frame assembly.

In yet another aspect, the secondary or prescription eyewear subassembly further comprises at least one prescription lens.

In yet another aspect, the secondary or prescription eyewear subassembly is joined to the lens frame assembly using a mechanical coupling. In one exemplary embodiment, the mechanical coupling can employ a tab and a receiving socket. The tab can be formed as a dovetail pin and the receiving slot can be formed as a dovetail socket. The preferred configuration would be a half-blind dovetail joint.

In yet another aspect, the secondary or prescription eyewear subassembly is joined to the lens frame assembly using a magnetic coupling.

In yet another aspect, the eyewear loupe assembly further comprises a camera assembly including a camera mounting arm, wherein the camera mounting arm is removably attached to one eyeglass frame end piece. The camera mounting arm can include a camera mounting arm attachment tab which is inserted into a camera mounting arm attachment slot formed within the eyeglass frame end piece. The camera mounting arm attachment tab is retained within the camera mounting arm attachment slot by a retention element, such as a set screw.

In yet another aspect, the eyewear loupe assembly further comprises a light emitting assembly including a light assembly mounting arm, wherein the light assembly mounting arm is removably attached to a second eyeglass frame end piece. The light assembly mounting arm can include a light assembly mounting arm attachment tab which is inserted into a light assembly mounting arm attachment slot formed within the eyeglass frame end piece. The light assembly mounting arm attachment tab is retained within the light assembly mounting arm attachment slot by a retention element, such as a set screw.

In yet another aspect, the light emitting element can be integrated into the camera assembly.

In yet another aspect, the camera assembly and the light emitting assembly can including a coupling system enabling the two elements to be temporarily joined together.

In yet another aspect, the camera assembly is pivotally assembled to the camera assembly mounting arm.

In yet another aspect, the light assembly is pivotally assembled to the light assembly mounting arm.

The loupe lensed eyewear provides a solution enabling ease of assembly, repair and replacement of one or both loupes and an ability to adjust the position and direction of each loupe to optimize the arrangement of the loupes for a specific user.

BRIEF DESCRIPTION OF THE DRAWINGS

The invention will now be described, by way of example, with reference to the accompanying drawings in which.

Like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
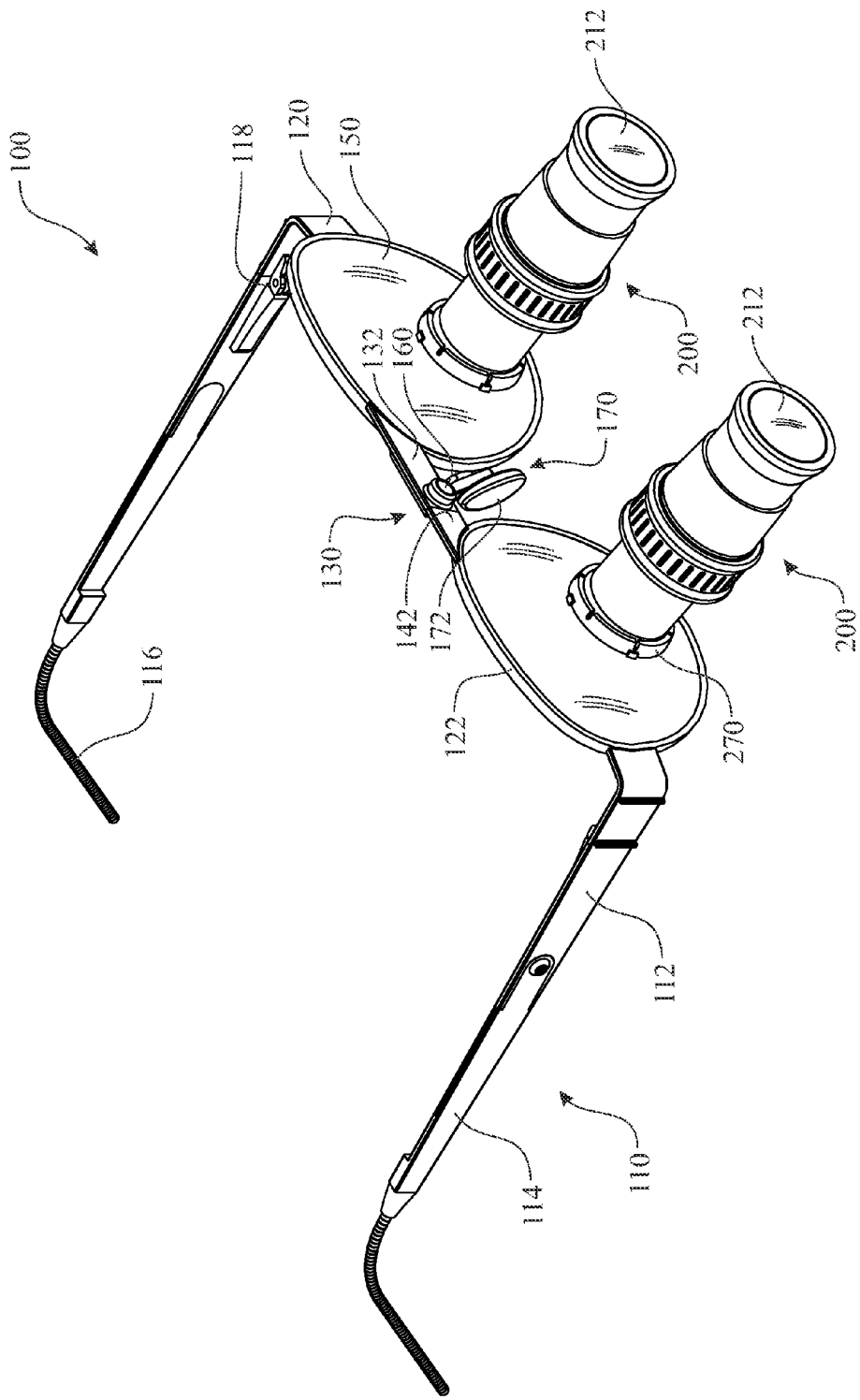
FIG. 1 presents an isometric front view of a first exemplary loupe lensed eyewear.

An exemplary loupe lensed eyewear 100 is illustrated in an isometric front view presented in FIG. 1, with details of a loupe subassembly 200 employed by the loupe lensed eyewear 100 being detailed in the various views presented in FIGS. 2 through 6. The loupe lensed eyewear 100 includes several features enabling adjustability of a frame portion of the loupe lensed eyewear 100 for properly positioning each loupe subassembly 200 respective to a user's eyes for use by a specific user. The adjustable features are introduced and detailed in FIGS. 7, 8, and 10-13.

The loupe lensed eyewear 100 comprises a pair of loupe subassemblies 200, each loupe subassembly 200 being removably attached to a respective eyewear lens 150, wherein the pair of eyewear lenses 150 are assembled to a frame subassembly. The frame subassembly includes a pair of telescoping temples 110, wherein each telescoping temple 110 is pivotally assembled to a primary frame section by a hinge 118. The primary frame section is segmented into a frame bridge segment 130; a pair of eye wire or rim 122, each eye wire or rim 122 being assembled to a respective end of a bridge segment 130; and a pair of end pieces 120, each end piece 120 being assembled to a distal end of each eye wire or rim 122. It is understood that in a configuration where the eye wires or rims 122 are joined together directly, the joint defines the frame bridge segment 130.

Figure 2:
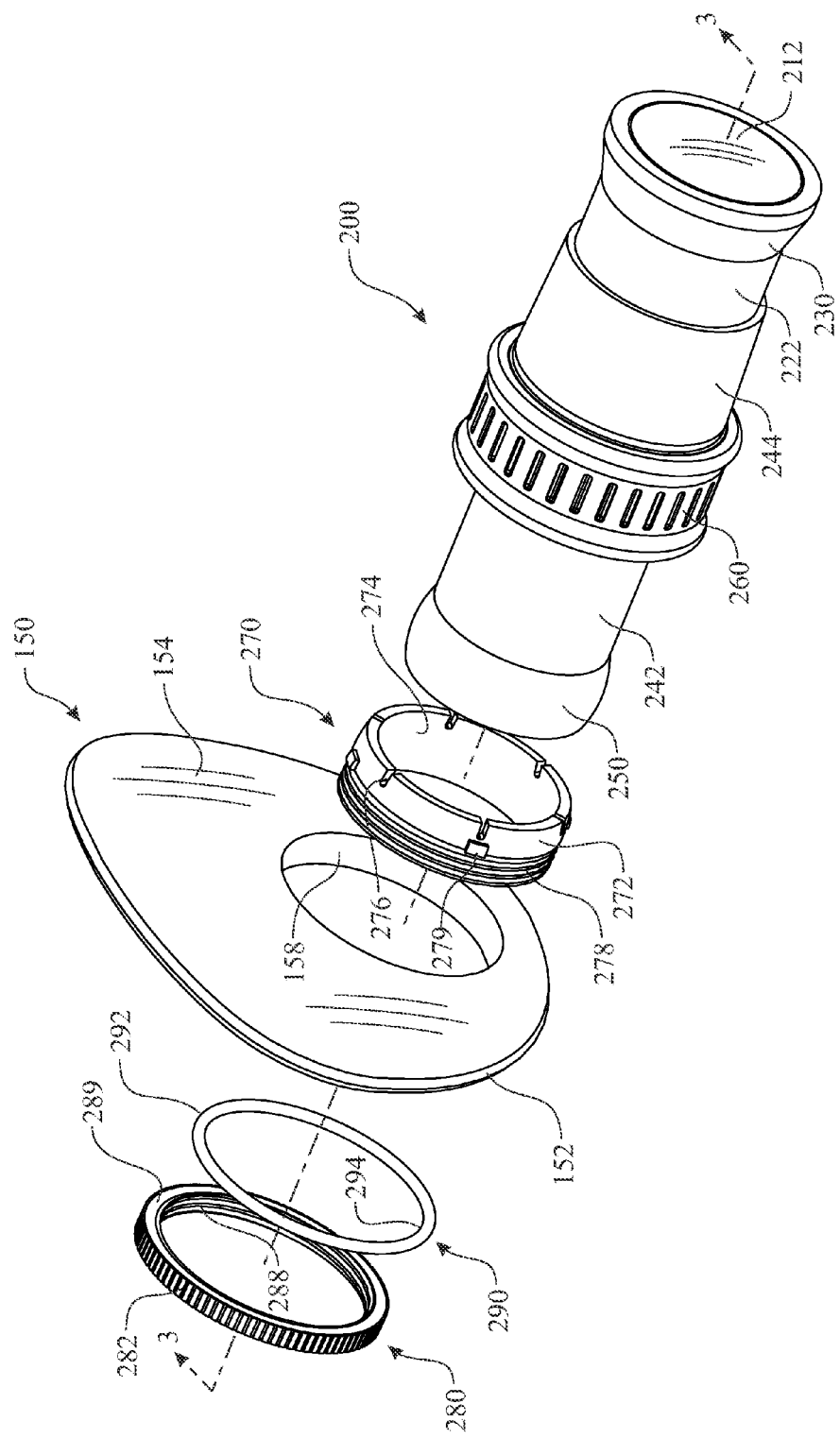
FIG. 2 presents an exploded isometric assembly view of a loupe and lens assembly of the loupe lensed eyewear originally introduced in FIG. 1.
Figure 3:
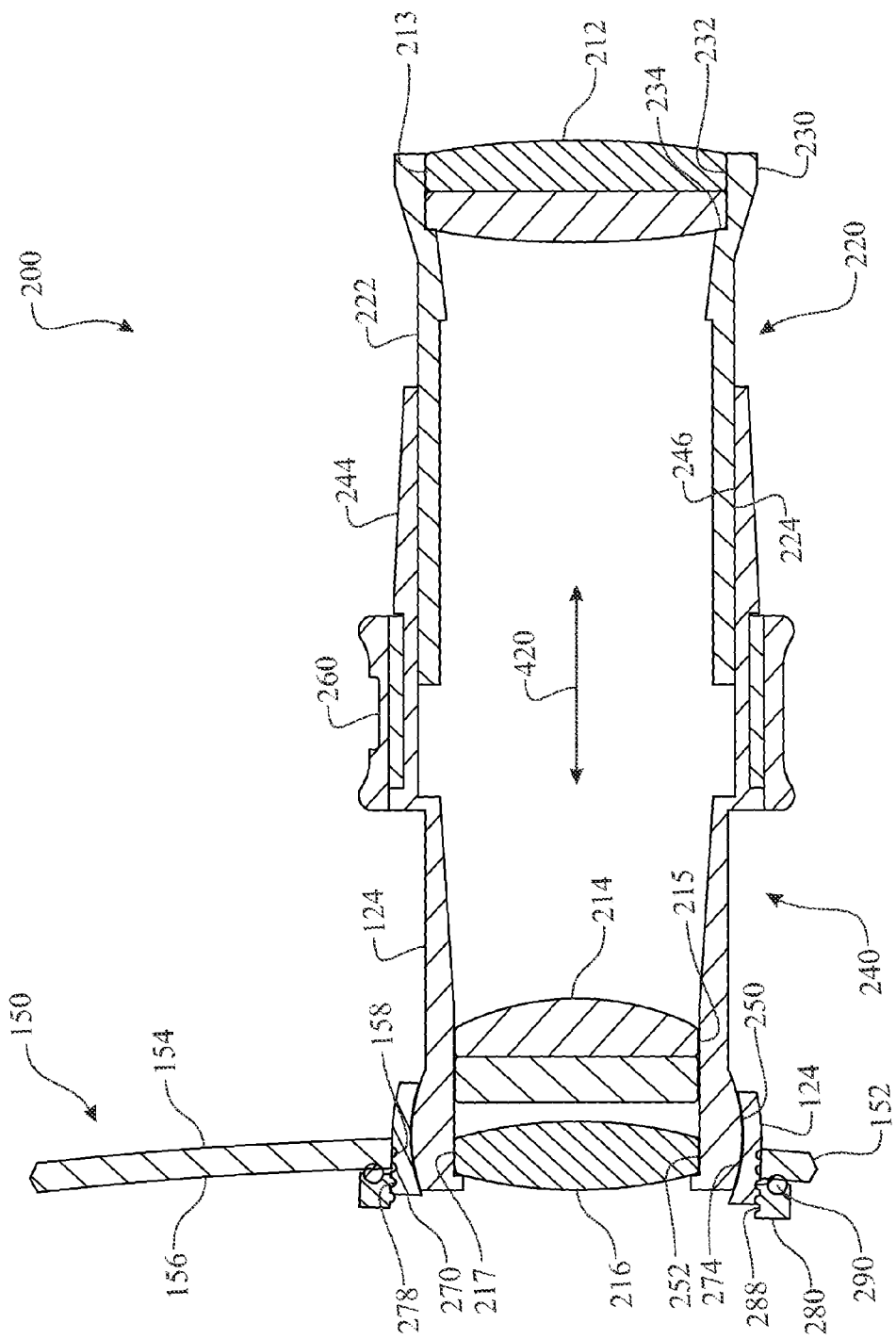
FIG. 3 presents a sectioned side view of the loupe and lens assembly of the loupe lensed eyewear, wherein the section is taken along section line 3--3 of FIG. 2.
Figure 4:
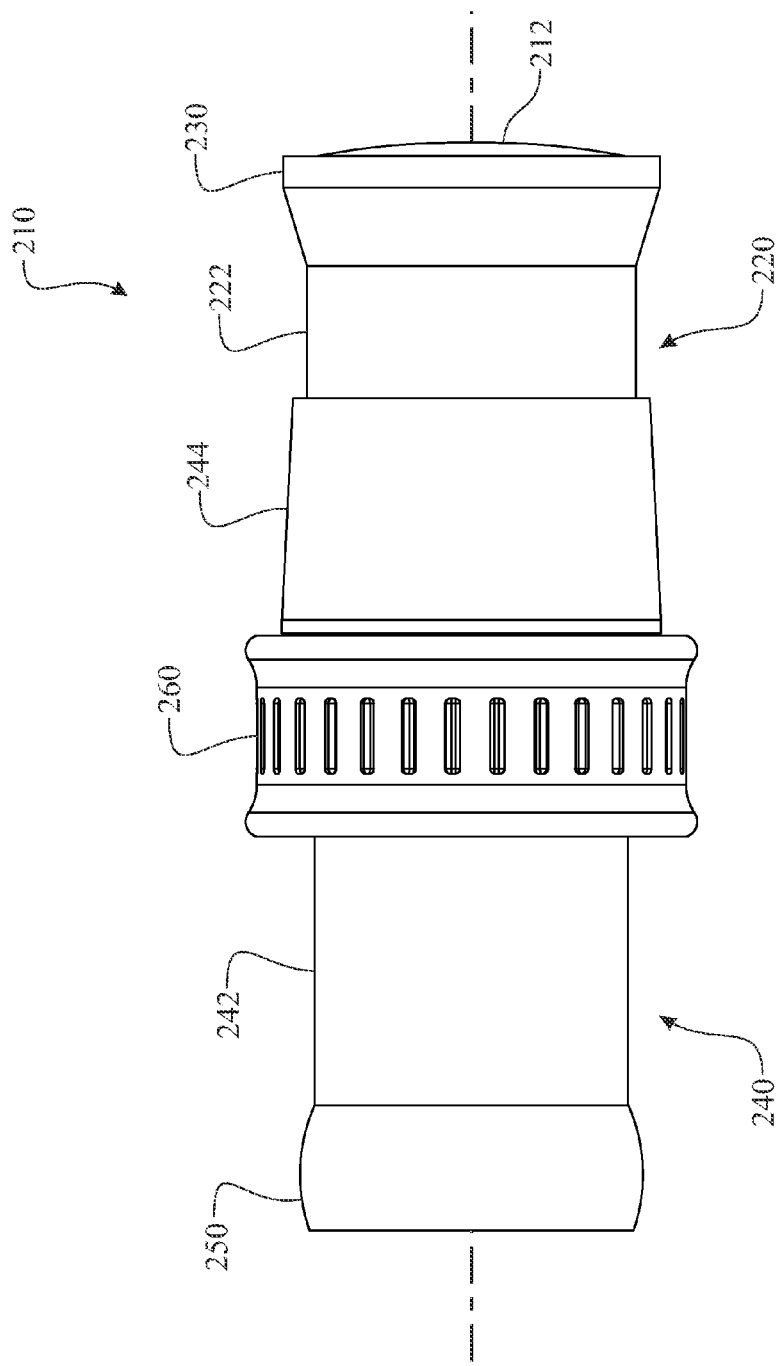
FIG. 4 presents a side view of the loupe assembly.
Figure 5:
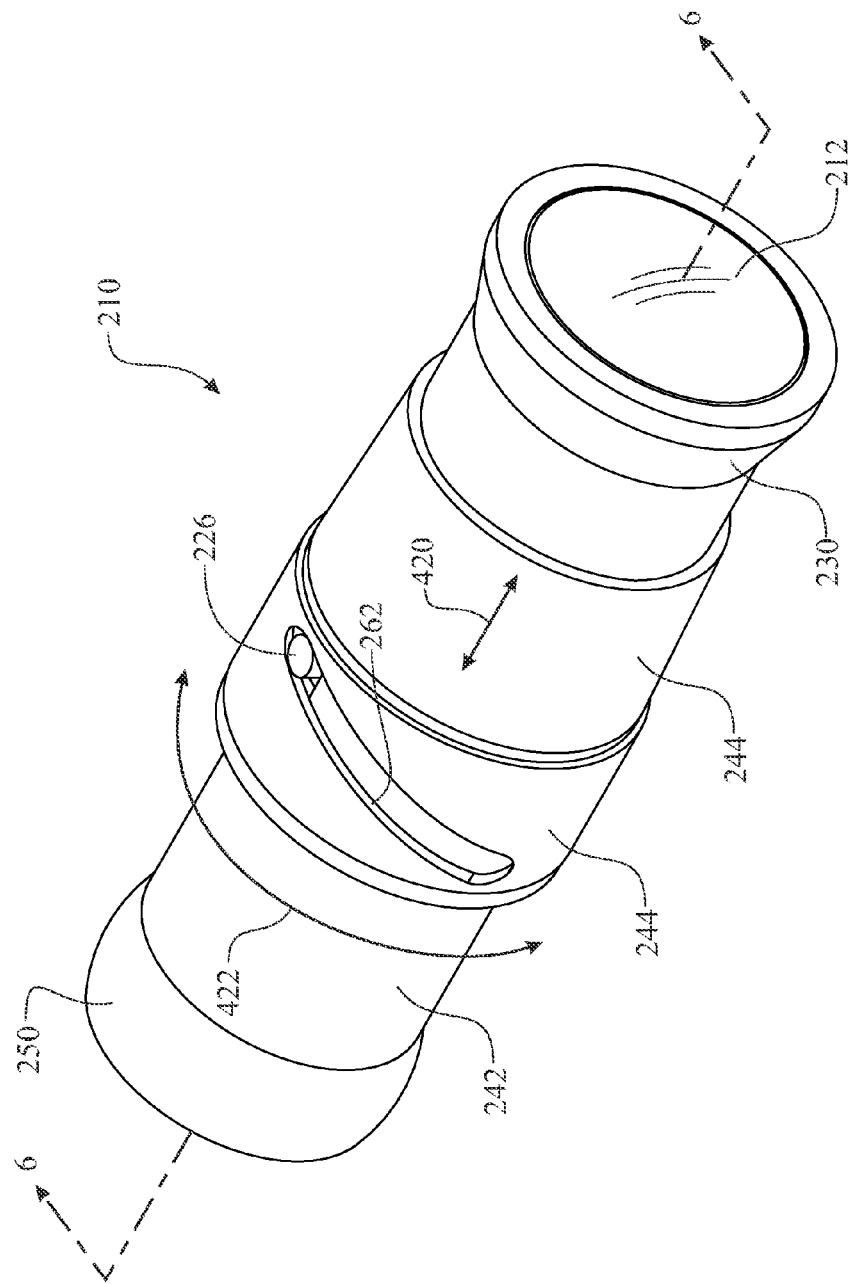
FIG. 5 presents an isometric view of the loupe assembly introducing a telescoping feature.

A pair of lenses 150 is assembled to the eye wire or rim 122 of the primary frame segment using any suitable design and associated assembly process. Each lens is defined having an eyewear lens exterior surface 154, an eyewear lens interior surface 156 located on a side of the eyewear lens 150 opposite of the eyewear lens exterior surface 154, and an eyewear lens peripheral edge 152 circumscribing and adjoining the surfaces 154, 156 as shown in FIGS. 2 and 3. The lenses 150 can be fabricated of glass, plastic, and the like. The exemplary embodiment employs a circumferential frame design that circumscribes the eyewear lens peripheral edge 152 of each respective eyewear lens 150. It is noted that, alternatively, a partially circumscribing frame may be utilized. A loupe receiving aperture 158 is bored through each respective eyewear lens 150 at a predetermined position for attachment of the loupe subassembly 200. In an application where the frame subassembly is not adjustable, the location of the loupe receiving aperture 158 would be determined based upon measurements defining the facial location of the target user's eyes. In an application where the frame subassembly is adjustable, the location of the loupe receiving aperture 158 can be located in a generally accepted location, wherein the final alignment to the target user's eyes would be accomplished by making adjustments to the configuration of the loupe lensed eyewear 100.

Each telescoping temple 110 can be fabricated of a single, fixed length member having a hinge member attached to a hinged end and a temple tip 116 attached to a distal end thereof. The temple tip 116 can be of any suitable material, shape, flexibility, and the like. The temple tip 116 can be coated with a pliant or other comforting material (such as rubber, nylon, plastic, and the like) for comfort for the user while wearing the loupe lensed eyewear 100. Functionally, each telescoping temple 110 pivots between an in use configuration (as shown in FIG. 1) and a stored configuration where the telescoping temple 110 would be rotated inward to a configuration parallel with the primary frame segment, wherein the motion is consistent with commonly available eyewear.

In a more desirable configuration, each telescoping temple 110 can be fabricated including a forward temple section 112 and a rear temple section 114, wherein the forward temple section 112 and rear temple section 114 are slideably assembled in a telescoping fashion. Elements and functionality of the telescoping feature are detailed in FIGS. 10 and 11. A channel 113 is formed within a distal end of the forward temple section 112. A mating finger 115 is formed in a mating, proximal end of the rear temple section 114. The forward temple section 112 and rear temple section 114 are assembled to one another by slideably engaging the finger 115 within the channel 113. The rear temple section 114 would be retained in a desired position respective to the forward temple section 112 by a telescoping temple retention element 119, thus defining a functional length of the telescoping temple 110. One exemplary telescoping temple retention element 119 is a threaded setscrew similar to a telescoping bridge retention element 160 introduced in FIG. 12. The telescoping feature enables expansion and contraction (in accordance with a temple telescoping motion 414) of a length of the telescoping temple 110 as enabled by a temple telescoped span 416. Although the exemplary embodiment presents the channel 113 being integrated into the forward temple section 112 and the finger 115 being integrated into the rear temple section 114, it is understood that the finger 115 can be integrated into the forward temple section 112 and the channel 113 can be integrated into the rear temple section 114. Although the exemplary embodiment utilizes a finger slideably assembled within a channel, it is understood that any suitable telescoping design can be incorporated for use therein.

Similarly, the primary frame section can be fabricated of a unitary bridge segment 130 having a fixed length, or, in a more desirable configuration, the bridge segment 130 can be fabricated including a first telescoping bridge segment 132 and a second telescoping bridge segment 142, wherein the first telescoping bridge segment 132 and second telescoping bridge segment 142 are slideably assembled in a telescoping fashion. Elements and functionality of the telescoping feature are detailed in FIGS. 7, 8 and 12. The first telescoping bridge segment 132 is fabricated having a tubular or partially tubular shape defining a telescope slot 134. A telescoping tongue segment 144 extends longitudinally from the second telescoping bridge segment 142. The telescoping tongue segment 144 is sized and shaped to slideably engage within the tubular interior 134. The telescoping feature enables expansion and contraction (in accordance with a bridge telescoping motion 410) of a length of the bridge segment 130 as enabled by a bridge telescoped span 412. The bridge telescoped span 412 can be defined by a depth of the telescope slot 134. It is noted that, under certain conditions, the bridge telescoped span 412 can be further limited by engagement of a telescoping tongue segment proximal end 147 with a telescope slot distal end 137 or engagement of a telescoping tongue segment distal end 146 with a telescope slot proximal end 136.

A telescoping bridge retention element 160 is employed to retain the adjustable bridge segment 130 at a fixed, desired length. The telescoping bridge retention element 160 is forming including a retention element tool receptacle 162 for engaging with a tool for rotating the telescoping bridge retention element 160 and a retention element threading 164 for threadably engaging with the first telescoping bridge segment 132 and a retention element engaging end 166 located opposite the retention element tool receptacle 162 for engaging with the telescoping tongue segment 144. The retention element tool receptacle 162 can be of any suitable and financially reasonable design, including a slot, a Phillips head design, a Torx design, a hex socket, a square socket, and the like.

A telescoping bridge retention element receptacle 138 is formed in the first telescoping bridge segment 132 at a location proximate a distal end thereof. A retention element receptacle threading 139 is formed on an interior surface of a bore passing through the telescoping bridge retention element receptacle 138 for threadably engaging with the telescoping bridge retention element 160. The telescoping bridge retention element 160 would be rotated in accordance with the threaded interface causing the retention element engaging end 166 to apply a pressure and respective frictional force to an engaging surface of the telescoping tongue segment 144. The engagement between the retention element engaging end 166 and the telescoping tongue segment 144 retains the telescoping tongue segment 144 in a desired position respective to the first telescoping bridge segment 132, thus defining a functional length of the bridge segment 130.

Figure 14:
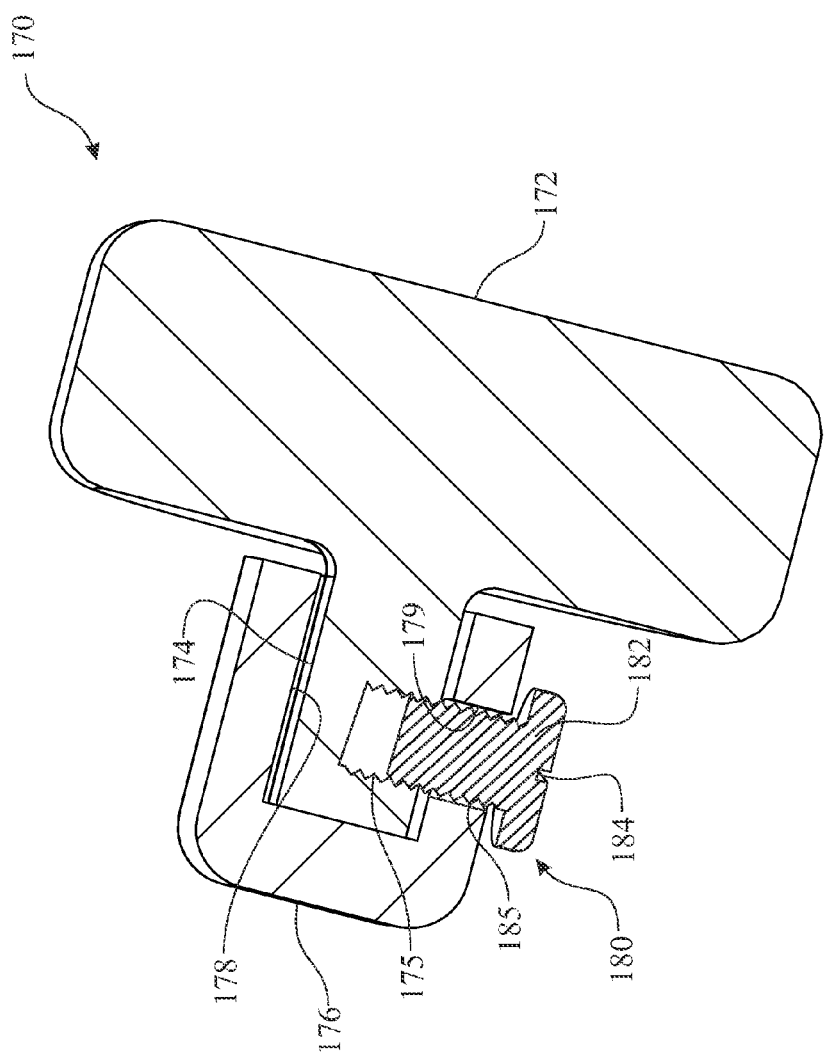
FIG. 14 presents a sectioned front view of the exemplary adjustable nose pad assembly, wherein the section is taken along section line 14--14 of FIG. 13.
Figure 15:
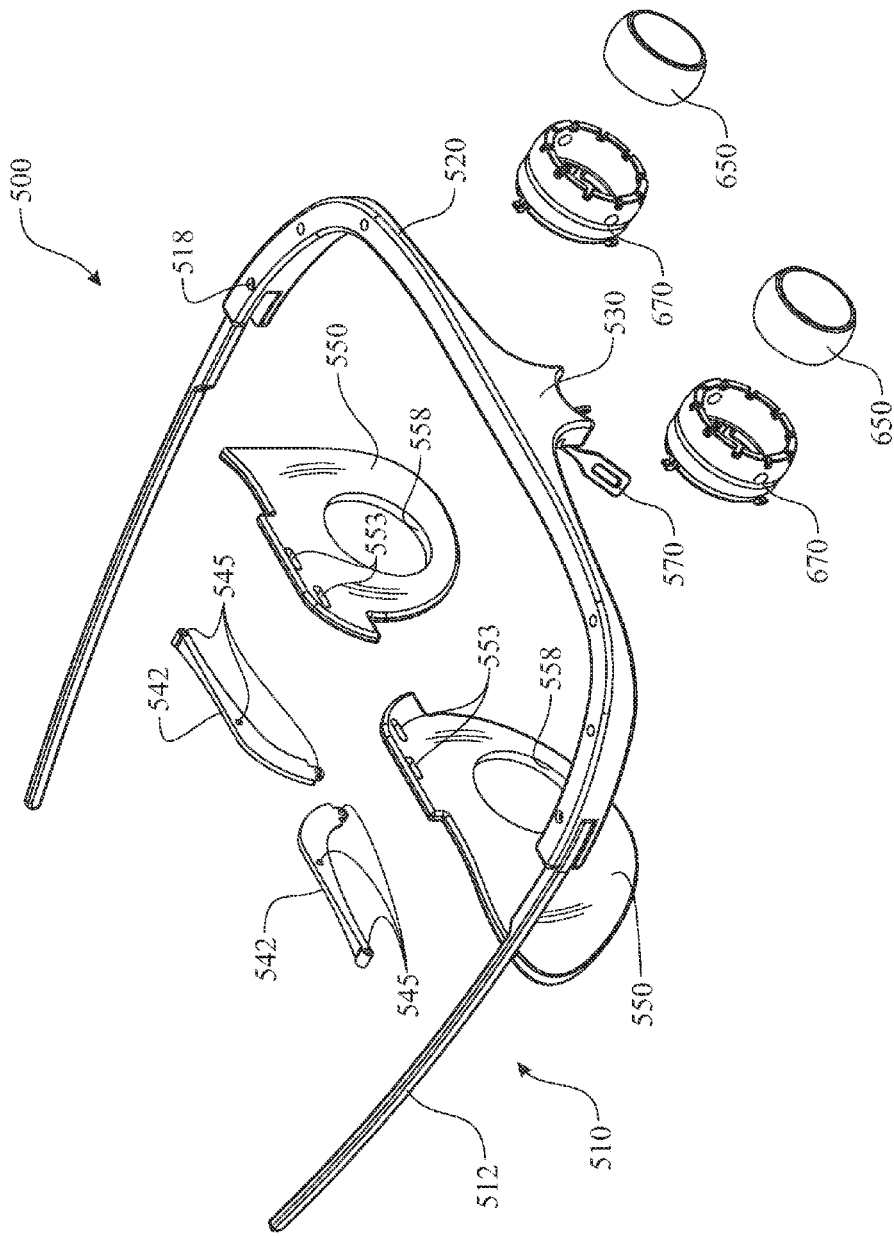
FIG. 15 presents an isometric front exploded assembly view of a second exemplary loupe lensed eyewear.
Figure 16:
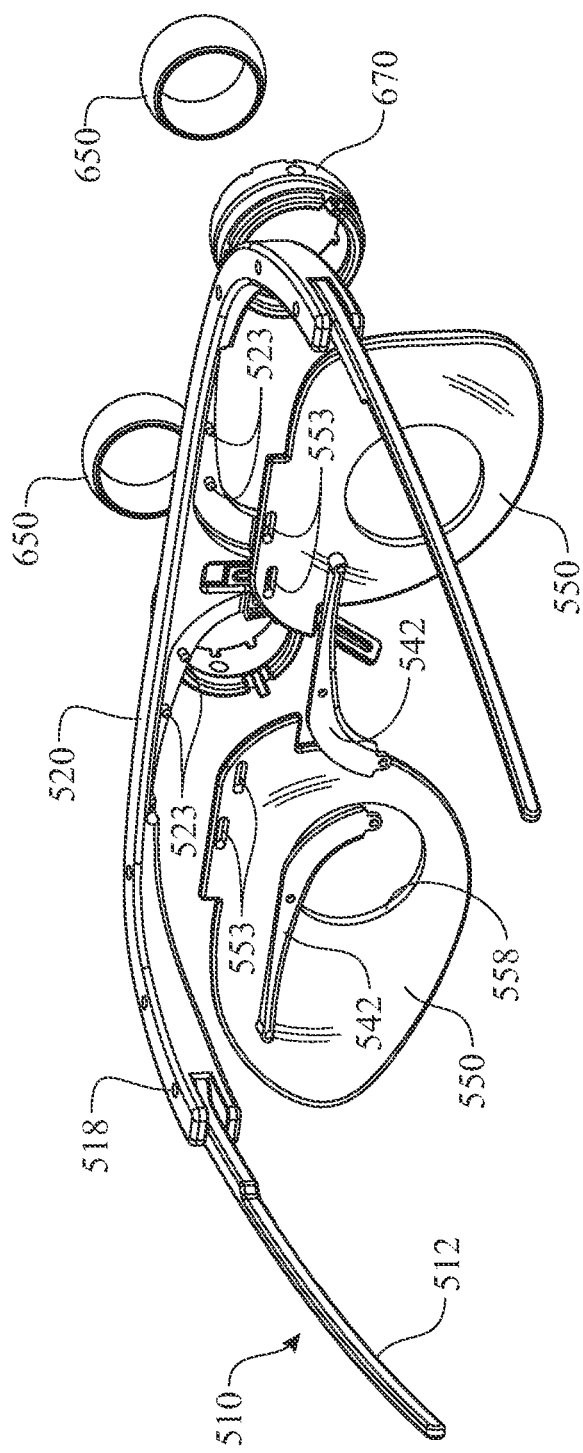
FIG. 16 presents an isometric front exploded assembly view of the loupe lensed eyewear originally introduced in FIG. 15.

A vertical positioning of the loupe subassembly 200 can be provided by a vertical adjustment feature. The vertical adjustment feature can be provided by an adjustable nose pad assembly 170, wherein the adjustable nose pad assembly 170 incorporates elements enabling vertical positioning of each of a pair of nose pads 172 as illustrated in the exemplary embodiment presented in FIGS. 13 and 14. A nose pad location adjustment member 176 forming a nose pad location adjustment channel 178 is affixed to the eye wire or rim 122 and/or first telescoping bridge segment 132, 142. A nose pad location adjustment slot 179 passes through a sidewall of the nose pad location adjustment member 176. Each nose pad 172 includes a nose pad attachment arm 174 extending outward therefrom. A nose pad threaded receptacle 175 is formed within the nose pad attachment arm 174 for receiving and engaging with a nose pad location retention element 180. In the exemplary embodiment, a sidewall of the nose pad threaded receptacle 175 is threaded. The nose pad threaded receptacle 175 is located to align with the nose pad location adjustment slot 179 when the nose pad attachment arm 174 is inserted into the nose pad location adjustment channel 178. The nose pad attachment arm 174 is sized to slideably position the nose pad 172 along a length of the nose pad location adjustment channel 178.

The nose pad location retention element 180 is provided to retain the nose pad 172 at a desired position along a length of the nose pad location adjustment channel 178. The nose pad location retention element 180 can be any suitable fastener, with the exemplary embodiment being a setscrew. The exemplary nose pad location retention element 180 includes a post comprising nose pad retention element threading 185 extending concentrically and axially from a contacting surface of a nose pad retention head 182. A nose pad retention element tool receptacle 184 is formed in the nose pad retention head 182. The nose pad retention element tool receptacle 184 can be of any suitable and financially reasonable design, including a slot, a Phillips head design, a Torx design, a hex socket, a square socket, and the like.

The nose pad 172 would be retained in position along a length of the nose pad location adjustment channel 178 by tightening the nose pad location retention element 180 within the nose pad threaded receptacle 175. The contacting surface of the nose pad retention head 182 and the opposing surface of the nose pad attachment arm 174 would provide a compression force against the wall of the nose pad location adjustment member 176 proximate the nose pad location adjustment slot 179. The compression force and respective friction generated therefrom retain the nose pad 172 at a desired position.

The combination of the adjustable telescoping temple 110, the adjustable bridge segment 130 and the adjustable nose pad assembly 170 enables adaptation of the eyewear frame assembly to properly position each loupe subassembly 200 to the individual.

Figure 6:
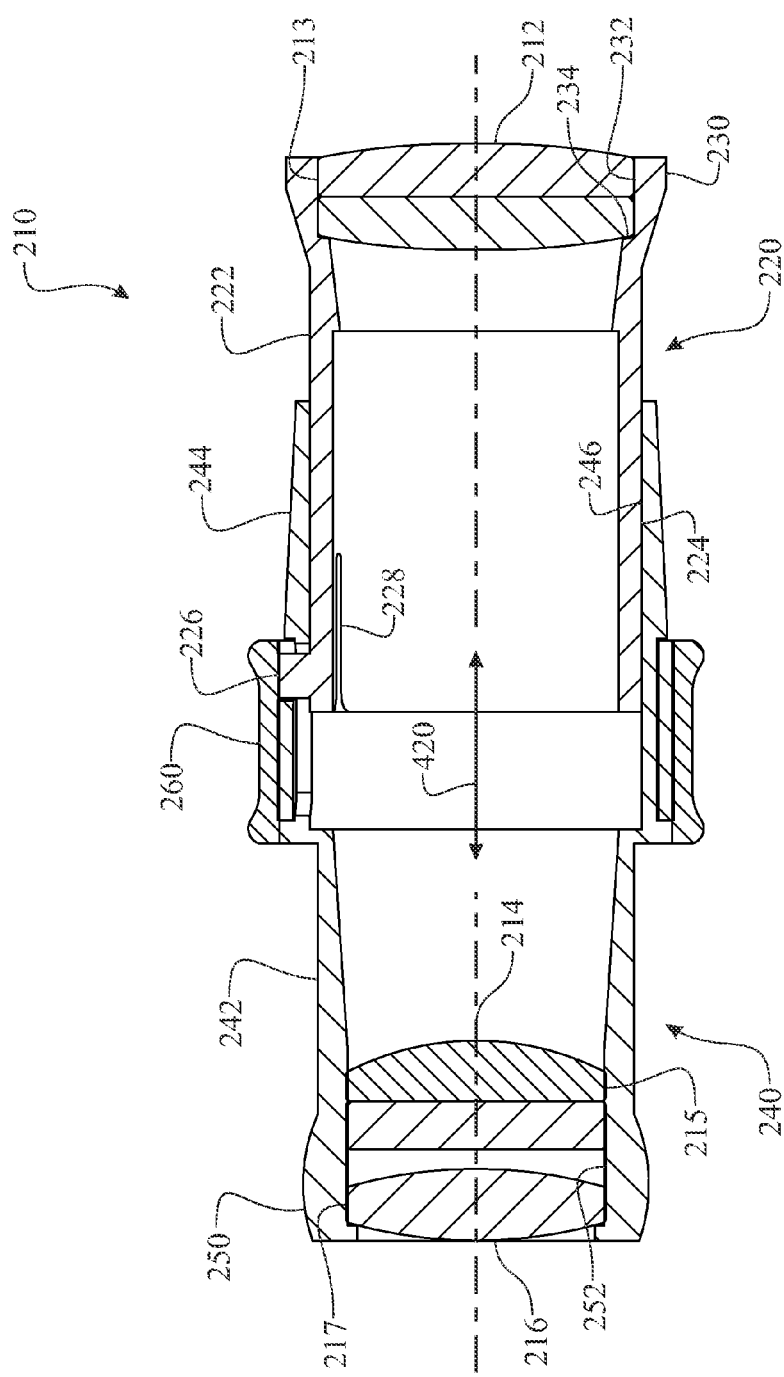
FIG. 6 presents a sectioned side view of the loupe assembly detailing elements utilized for the telescoping feature.
Figure 7:
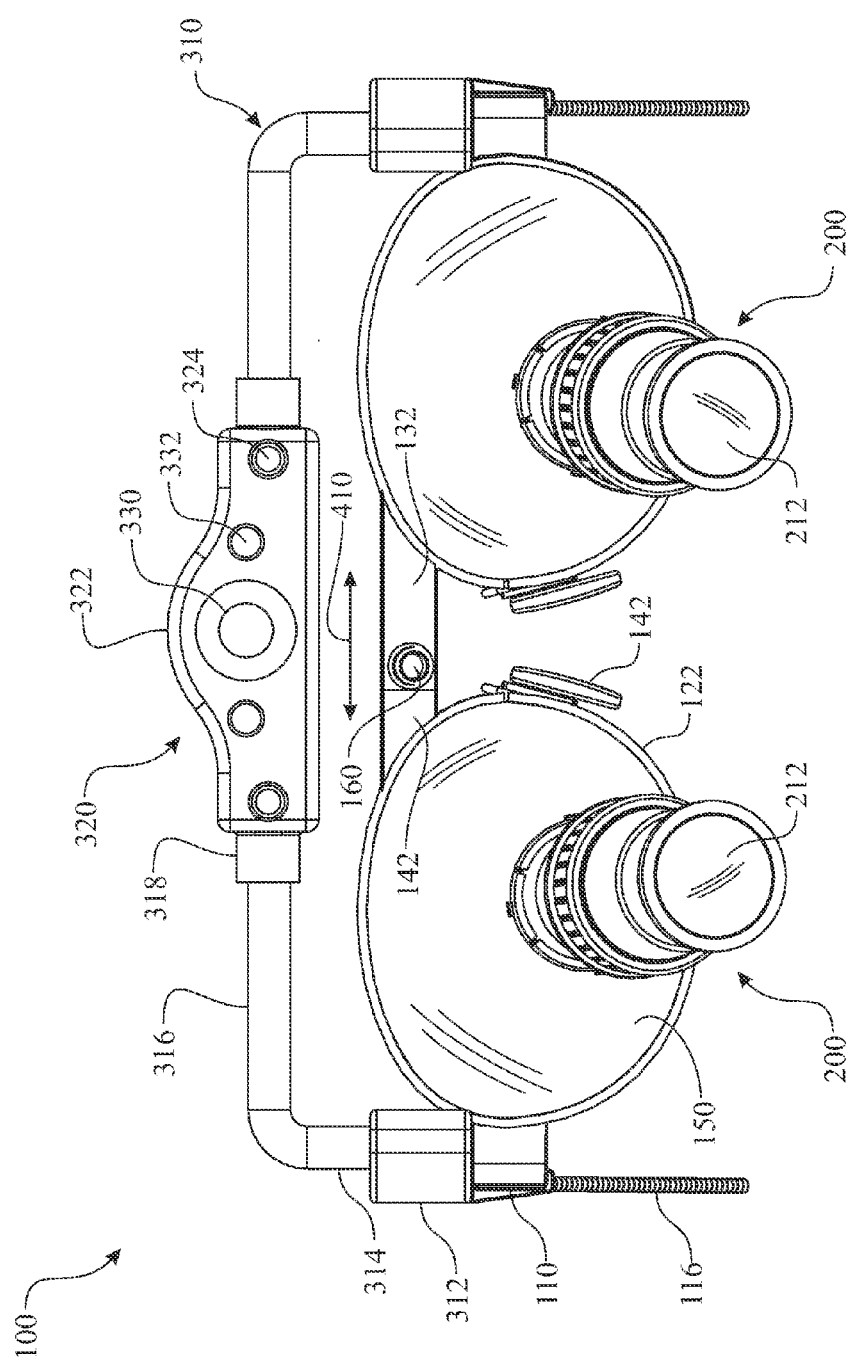
FIG. 7 presents a front view of the loupe lensed eyewear introducing an adjustable camera accessory, wherein the eyewear frame is shown in a contracted width configuration.
Figure 8:
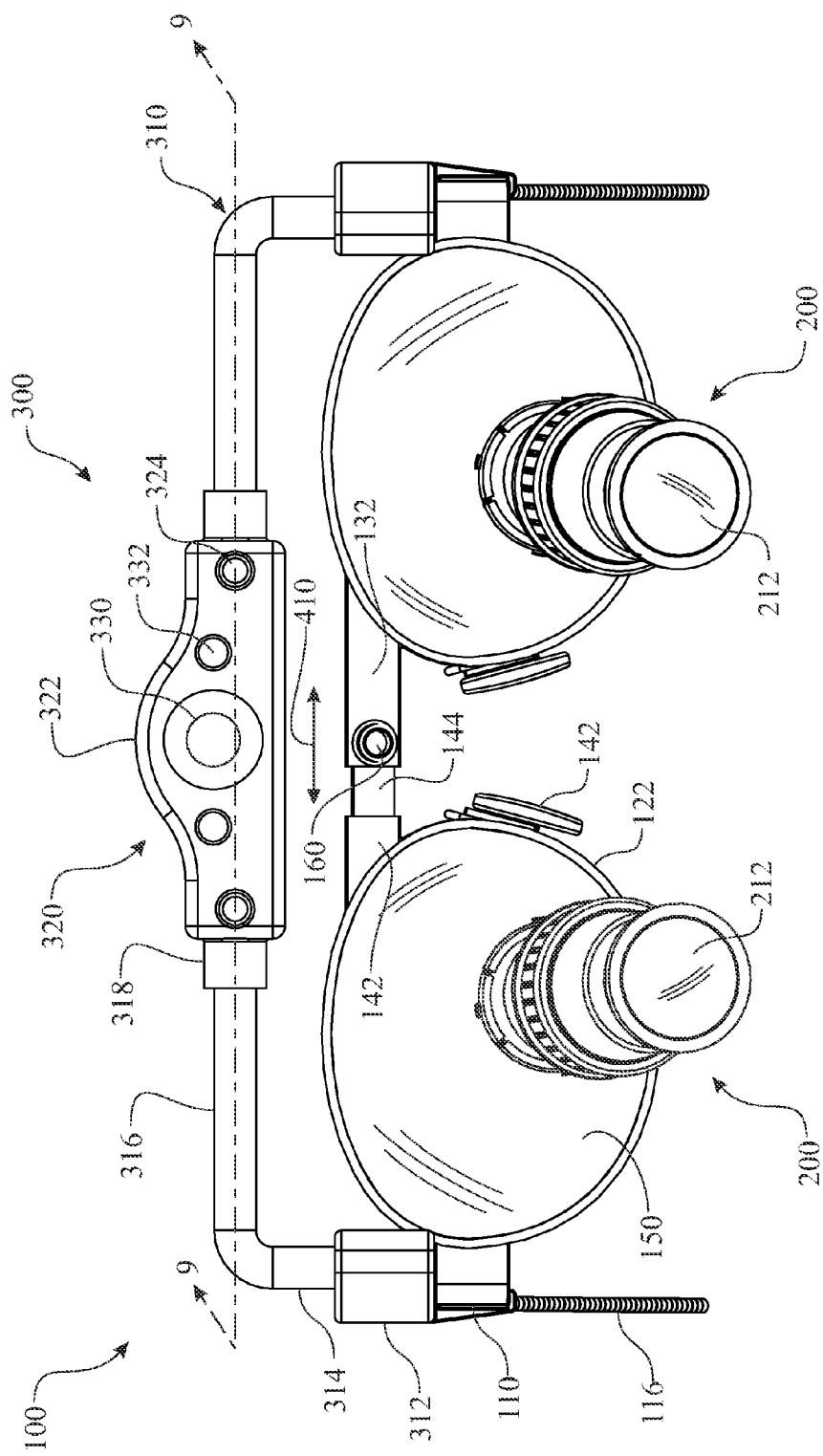
FIG. 8 presents a front view of the loupe lensed eyewear and adjustable camera accessory shown in an expanded width configuration.
Figure 9:
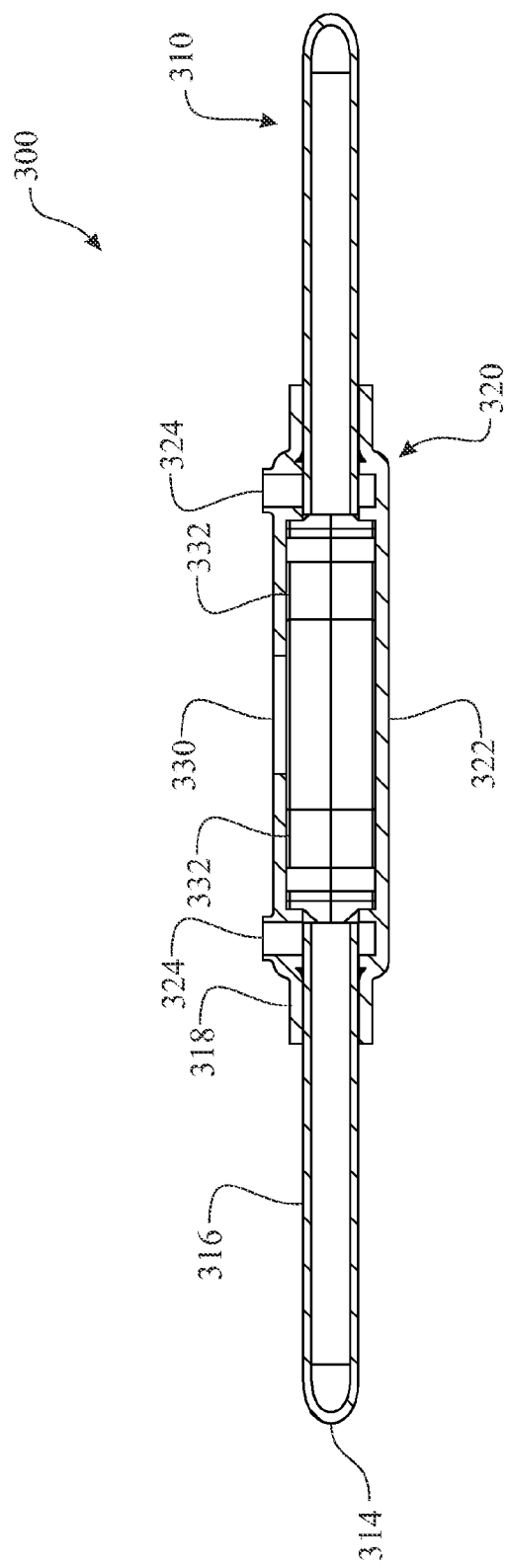
FIG. 9 presents a sectioned top view of the adjustable camera accessory, wherein the section is taken along section line 9--9 of FIG. 8.

Details of the loupe subassembly 200 are presented in FIGS. 1 through 6. The loupe subassembly 200 includes an object lens 212 assembled to an object end of an optical barrel subassembly 210 and an eyepiece lens 216 assembled to an eyepiece end of the optical barrel subassembly 210 as best illustrated in FIGS. 3 and 6. The loupe subassembly 200 can additionally include an intermediary lens 214 located within the optical barrel subassembly 210 between the object lens 212 and eyepiece lens 216. An intermediary lens peripheral edge 215 of the intermediary lens 214 would be seated against the eyepiece lens radial retention seat 252 or any other suitable interior surface of the optical barrel subassembly 210.

An object lens peripheral edge 213 of the object lens 212 is radially seated against an object lens radial retention seat 232 of an object lens retainer 230 and axially seated against an object lens axial retention seat 234 thereof. An eyepiece lens peripheral edge 217 of the eyepiece lens 216 is radially seated against an eyepiece lens radial retention seat 252 of the eyepiece lens barrel 240 and axially seated against a flange as illustrated.

The loupe subassembly 200 can be assembled to the lens 150 using any suitable design enabling an omni-directional pivoting motion of the loupe barrel. In the exemplary embodiment, a convex surfaced coupling ring 250 is provided proximate an attachment end of the optical barrel subassembly 210. The convex surfaced coupling ring 250 is formed similar to a compression ring used in plumbing applications. The convex surfaced coupling ring 250 is formed having an annular shape, wherein the external peripheral surface of the convex surfaced coupling ring 250 is convex. A compression applying assembly ring 270 has an annular shape comprising a loupe assembly ring inner surface 274 and an opposite outer surface. The compression applying assembly ring 270 is segmented axially into a loupe assembly ring expansion segment 272 and an attachment segment, such as a loupe assembly ring threaded segment 278. The exterior surface can include a taper to aid in creation of a compressive force when the compression applying assembly ring 270 is drawn through the loupe receiving aperture 158. The loupe assembly ring inner surface 274 can have a tapered or frustum shape, a concave shape (as shown in FIG. 3), and the like, wherein the shape applies pressure or a compressive force to the exterior surface of the convex surfaced coupling ring 250 when the compression applying assembly ring 270 is drawn through the loupe receiving aperture 158. A series of loupe assembly ring expansion slots 276 can be introduced in a spatial arrangement about one or both ends of the compression applying assembly ring 270. The series of loupe assembly ring expansion slots 276 provide flexibility to the edge, enabling passage of the widest diameter of the convex surfaced coupling ring 250. At least one loupe assembly ring axial retention feature 279 extends outward from the exterior surface of the compression applying assembly ring 270, wherein the at least one loupe assembly ring axial retention feature 279 defines a plane oriented perpendicular to a central axis of the compression applying assembly ring 270 and has an effective exterior diameter that is larger than a diameter across the loupe receiving aperture 158. The at least one loupe assembly ring axial retention feature 279 retains the compression applying assembly ring 270 is an axial location when a tensile force is generated by assembly of the assembly ring fastener 280 thereto. The assembly ring fastener 280 has an annular shape comprising an assembly ring fastener peripheral surface 282 about an exterior circumference and an assembly ring fastener threaded inner surface 288 about an interior circumference. An assembly ring fastener contacting edge surface 289 spans between respective edges of the exterior circumference and the interior circumference on a contacting side thereof. The assembly ring fastener peripheral surface 282 can be knurled, non-circular in shape, and the like to provide a gripping surface for applying a torque to the assembly ring fastener 280. A loupe gasket 290 can be placed between the assembly ring fastener 280 and the eyewear lens interior surface 156 of the eyewear lens exterior surface 154. The loupe gasket 290 can provide dampening between the assembly ring fastener 280 and the eyewear lens 150, thus reducing induced stresses from the applied compression, reducing any impact forces when the loupe subassembly 200 contacts an object, and the like. The loupe gasket 290 would be sized by an outer diameter spanning across a loupe gasket outer circumference 292 and an inner diameter spanning across a loupe gasket inner circumference 294. The outer diameter would be preferably similarly sized comparable to a diameter of the assembly ring fastener peripheral surface 282. The inner diameter would be suitable for the designated installation, such as being proximate a diameter of a flange extending axially from the assembly ring fastener contacting edge surface 289 (as illustrated in FIG. 3), proximate a diameter of the loupe assembly ring threaded segment 278, designed to partially seat within a recess formed within the assembly ring fastener contacting edge surface 289, and the like.

As best presented in FIG. 3, the interface between the convex surfaced coupling ring 250 and the compression applying assembly ring 270 enables a swiveling motion of the optical barrel subassembly 210 when the assembly ring fastener 280 is not secured in location and restricts the motion of the optical barrel subassembly 210 to the seated angle when the assembly ring fastener 280 is adequately torque against the eyewear lens interior surface 156. The threaded interface between the compression applying assembly ring 270 and assembly ring fastener 280 enables quick installation of the loupe subassembly 200 onto the eyewear lens 150 and easy replacement which can be accomplished by a suitably skilled layperson.

In one embodiment, the optical barrel subassembly 210 is a fixed length. In an enhanced variant, the optical barrel subassembly 210 is segmented into a telescoping form factor. The telescoping function can enable adjustable magnification, focusing, binocular focusing, and other potential additional features to a normally fixed loupe design. In the exemplary embodiment, the eyepiece lens barrel body 242 can include a telescoping control button 262, wherein the telescoping control button 262 extends diagonally about a circumference thereof. A lens assembly and focal control element 226 extends radially outward from a flexible segment of the object lens barrel body 222. Flexibility is provided by a pair of control element cantilever slot 228 extending axially from a mating end thereof and on each side of the lens assembly and focal control element 226. The pair of control element cantilever slot 228 creates a cantilevered section enabling the lens assembly and focal control element 226 to be compressed inwards when desired. The lens assembly and focal control element 226 extends through the telescoping control button 262 when the compressive force is removed therefrom. The diagonal orientation of the telescoping control button 262 provides a telescoping motion when rotated. The lens assembly and focal control element 226 remains in a fixed position causing the diagonally oriented telescoping control button 262 to move the overlapping barrel segment 244 in a telescoping manner in accordance with a loupe barrel telescoping motion 420. An overlapping barrel segment interior surface 246 of the overlapping barrel segment 244 slideably engages with an object lens barrel body exterior surface 224 of the object lens barrel body 222. The object lens barrel 220 and eyepiece lens barrel 240 can be separated by depressing the lens assembly and focal control element 226 inward until the lens assembly and focal control element 226 clears the interior surface of the overlapping barrel segment 244. A barrel central support ring 260 can be assembled over the segment of the overlapping barrel segment 244 comprising the telescoping control button 262 to ensure against any intrusion of any dust, moisture, or other contaminants. The barrel central support ring 260 can additionally apply a frictional force to a distal surface of the lens assembly and focal control element 226 to aid in retaining the object lens barrel 220 in a desired rotated position. Although a slot and protrusion design is presented, it is understood that any suitable aid for creating a telescoping interface can be incorporated into the design of the optical barrel subassembly 210.

The loupe lensed eyewear 100 can be enhanced with the inclusion of a camera accessory 300 as illustrated in FIGS. 7 through 11. The camera accessory 300 includes a camera subassembly 320 pivotally attached to a camera mounting frame 310. The camera subassembly 320 includes a camera and lens combination 330 and ancillary supporting elements, including at least one light emitting element 332 contained within a camera housing 322. The camera mounting frame 310 includes a camera mounting frame vertical segment 314 extending generally perpendicularly from each end of a camera mounting frame horizontal segment 316. The camera accessory 300 integrates a camera housing pivot bushing 318 between each end of the camera housing 322 and the mating section of the camera mounting frame 310 (more specifically, the camera mounting frame horizontal segment 316), wherein the camera housing pivot bushing 318 enables rotation of the camera housing 322 about the camera mounting frame 310 in accordance with a camera rotational motion 430. The camera housing 322 can be retained at a rotated angle by at least one camera housing retention element 324. The camera housing retention element 324 would be similar to the telescoping bridge retention element 160 and all of the associated elements thereof. The rotation of the camera subassembly 320 enables alignment of the camera and lens combination 330 with the focal point of the loupe subassembly 200.

Figure 10:
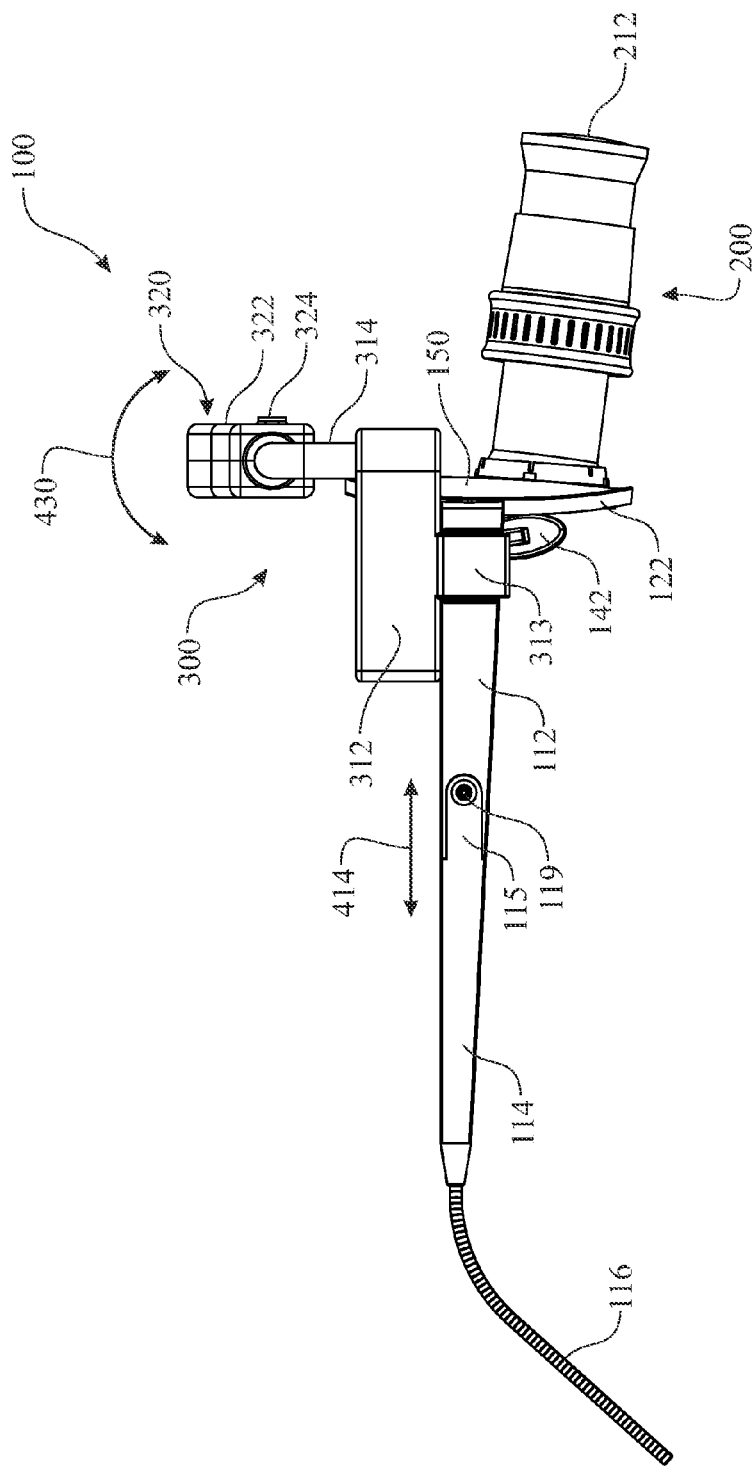
FIG. 10 presents a side view of the loupe lensed eyewear and adjustable camera accessory combination, wherein the eyewear frame is shown in a contracted temple configuration.
Figure 11:
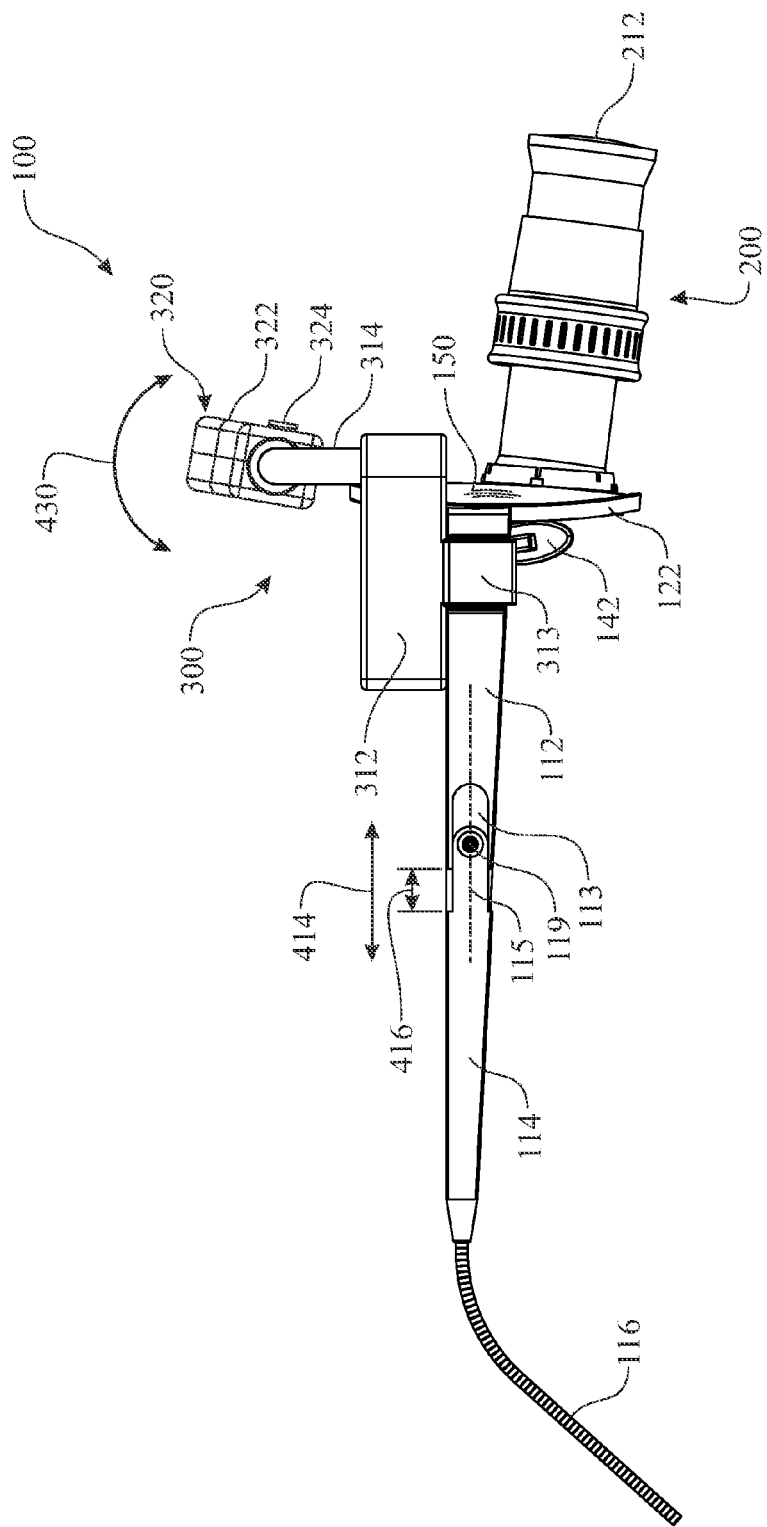
FIG. 11 presents a front view of the loupe lensed eyewear and adjustable camera accessory shown in an expanded width configuration.
Figure 12:
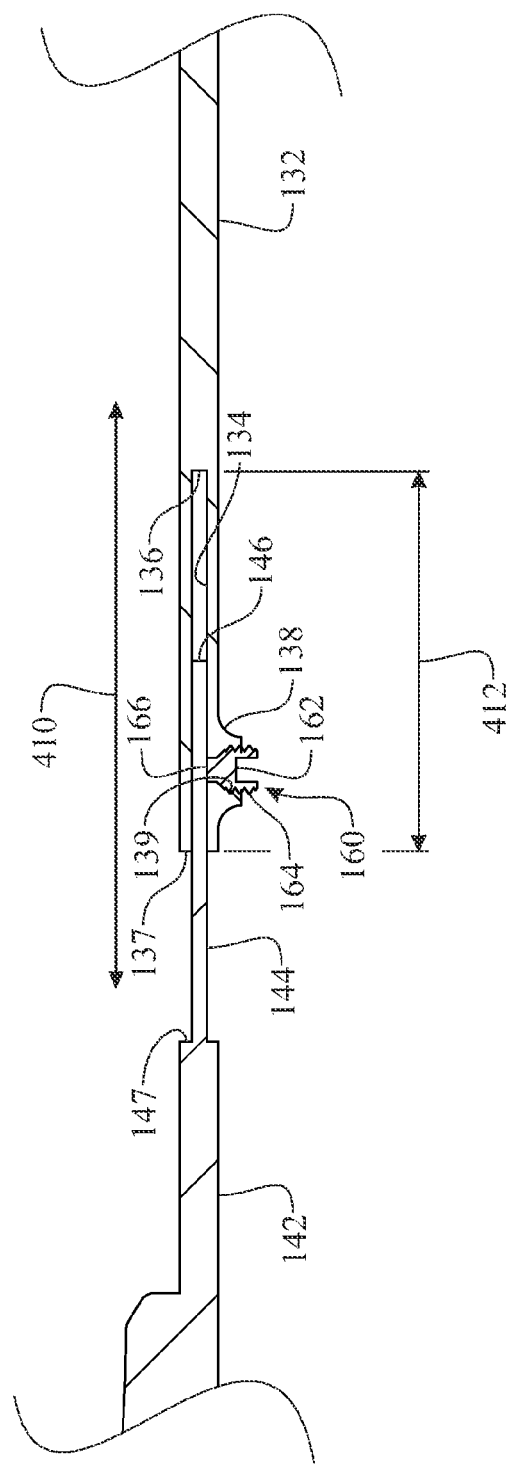
FIG. 12 presents a sectioned top view of a telescoping frame bridge portion of the eyewear frame, wherein the section is taken along a central horizontal line.
Figure 13:
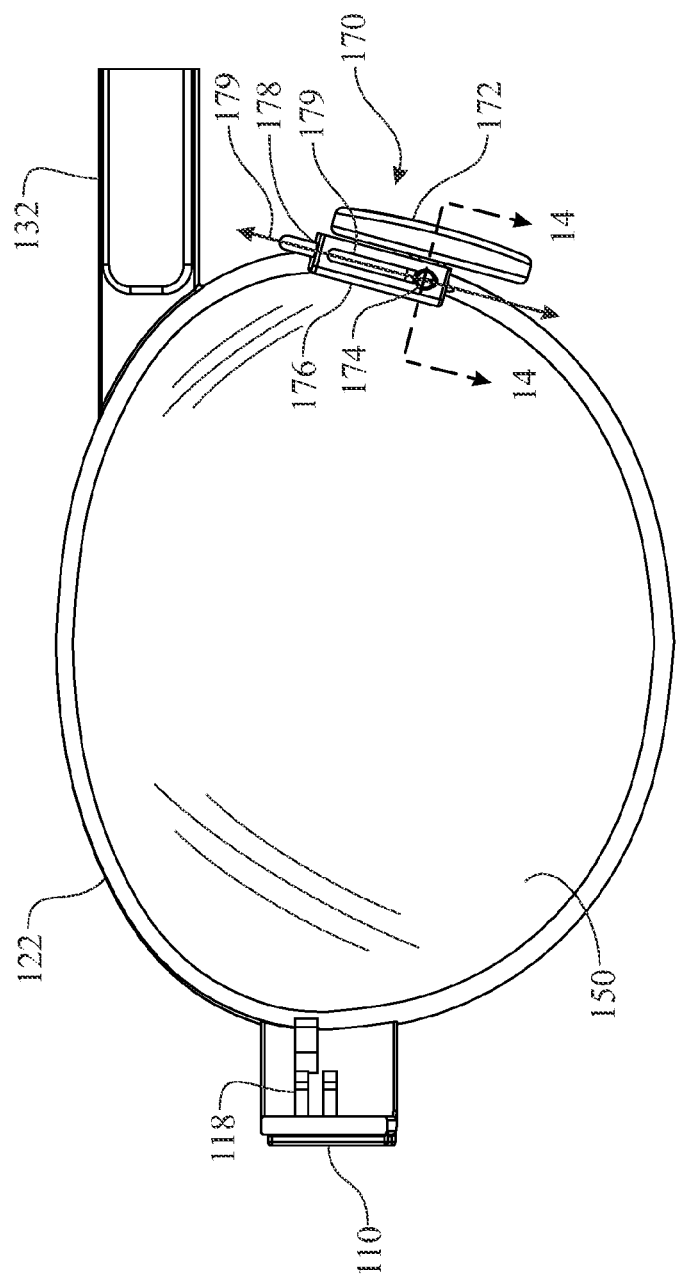
FIG. 13 presents a front view of one exemplary lens introducing a vertical adjustment feature for vertically adjusting a position of a nose pad.

The camera mounting frame 310 is removably attached to the eyewear primary frame by a bracket clamping element 313 extending downward from a power and electronics housing 312 as illustrated in FIGS. 10 and 11. Each of a pair of power and electronics housings 312 is assembled to a distal end of the camera mounting frame vertical segment 314. The power and electronics housing 312 can be used to house electronics and batteries for operating the camera system. The electronics can include a connector or a wireless communication protocol for transferring recording images from the camera system to an external data storage medium, such as a medical data server. The bracket clamping element 313 would be designed for adaptation to any common eyewear frame cross-section shape.

The camera mounting frame 310 can include features that accommodate changes in a width of the eyewear primary frame. The camera mounting frame horizontal segment 316 can be provided as two segments, as best shown in the section view presented in FIG. 9. Each camera housing retention element 324 would be loosened enabling the camera mounting frame horizontal segment 316 to slide axially into a desired position establishing a mounting width.

The loupe lensed eyewear 100 presents a first exemplary embodiment providing adjustable eyewear for aligning a pair of loupe subassemblies 200 with a user's eyes. The loupe lensed eyewear 100 incorporates telescoping frame elements to position the loupe subassembly 200 accordingly. The concept can be modified by repositioning each lens on the frame, as introduced by an exemplary loupe lensed eyewear 500 presented in FIGS. 15 through 22. Like features of the loupe lensed eyewear 500 and the loupe lensed eyewear 100 are numbered the same except preceded by the numeral '5' Like features of the loupe subassembly 600 and the loupe subassembly 200 are numbered the same except preceded by the numeral '6'.

The loupe lensed eyewear 500 pivotally assembles a pair of temples 510 to lens supporting frame section 520 using a hinge 518 at each pivoting joint. Each temple 510 can be fabricated having a fixed temple arm 512 or a telescoping variant as previously described. A frame bridge 530 refers to a central section of the lens supporting frame section 520.

Figure 19:
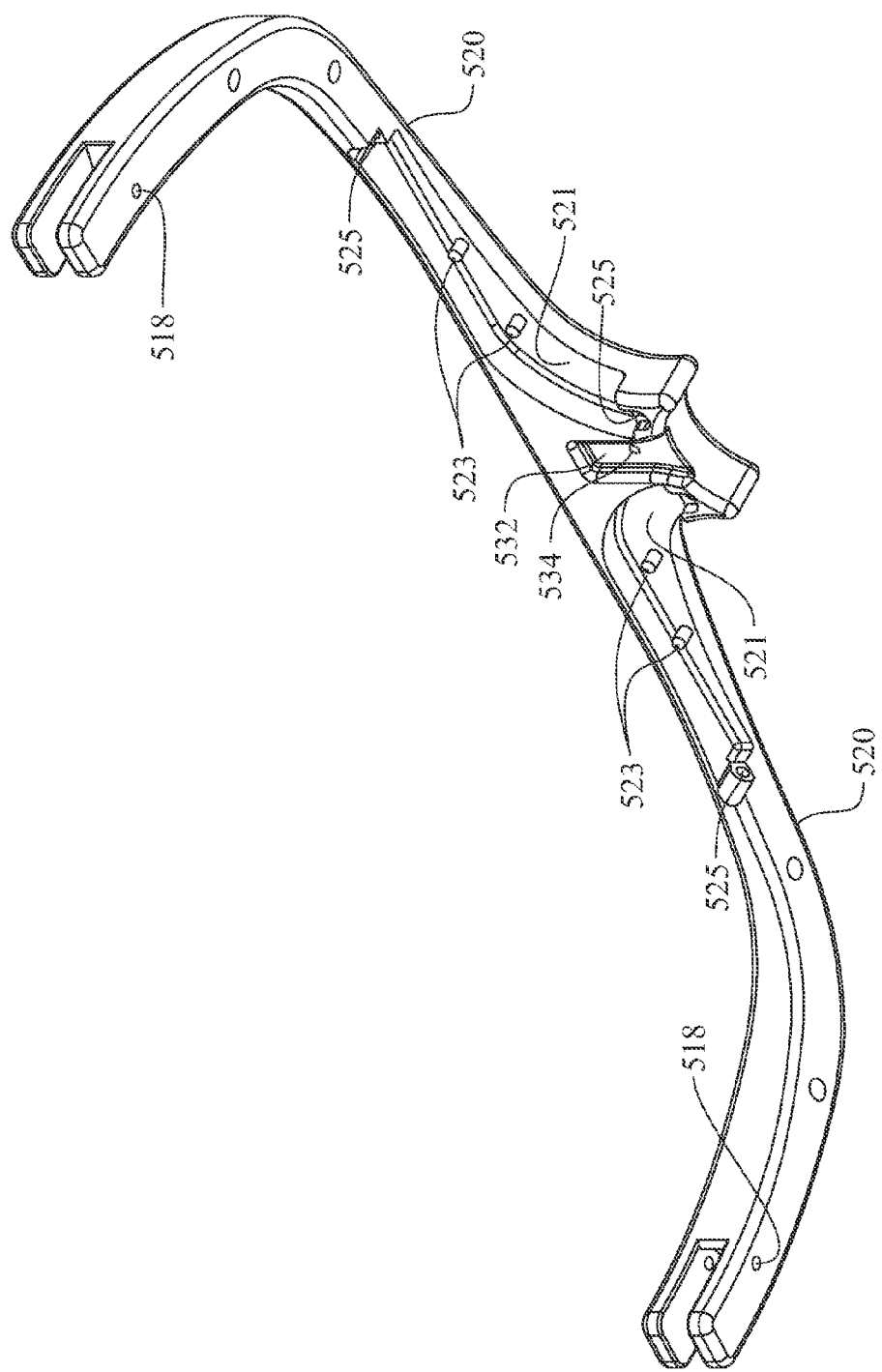
FIG. 19 presents an isometric rear view introducing element of a primary frame member of the loupe lensed eyewear originally introduced in FIG. 15.
Figure 20:
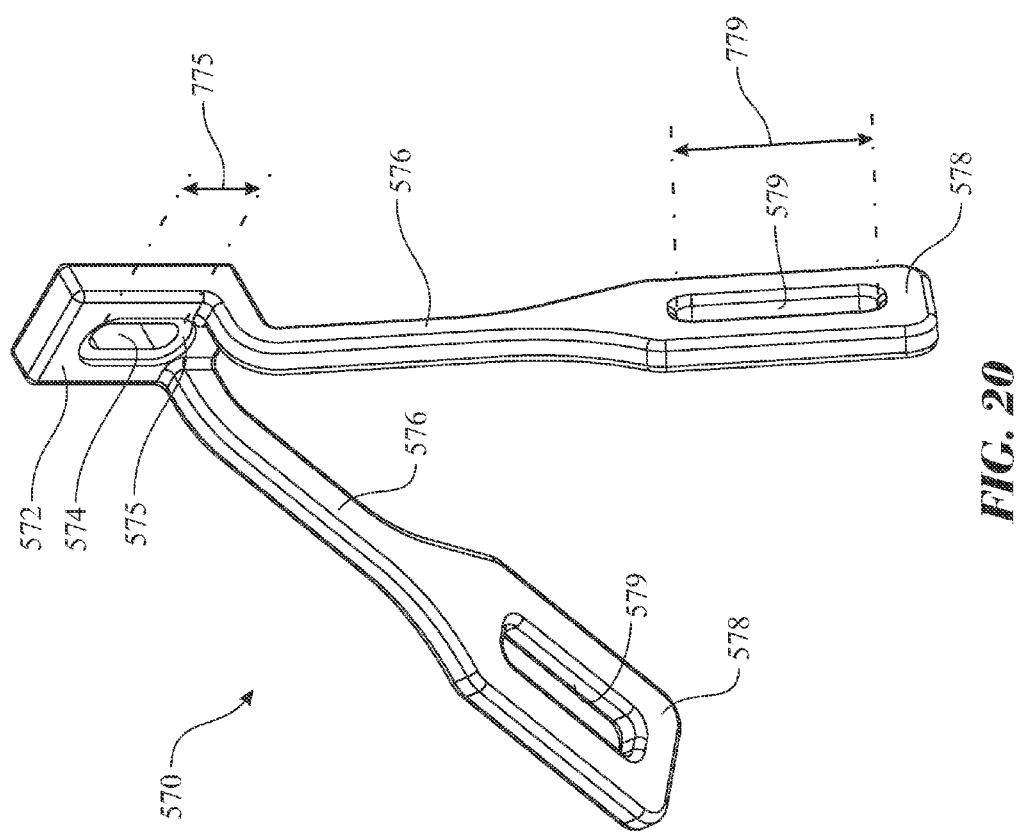
FIG. 20 presents an isometric rear view detailing elements of an adjustable nose pad support frame employed by the loupe lensed eyewear originally introduced in FIG. 15.
Figure 21:
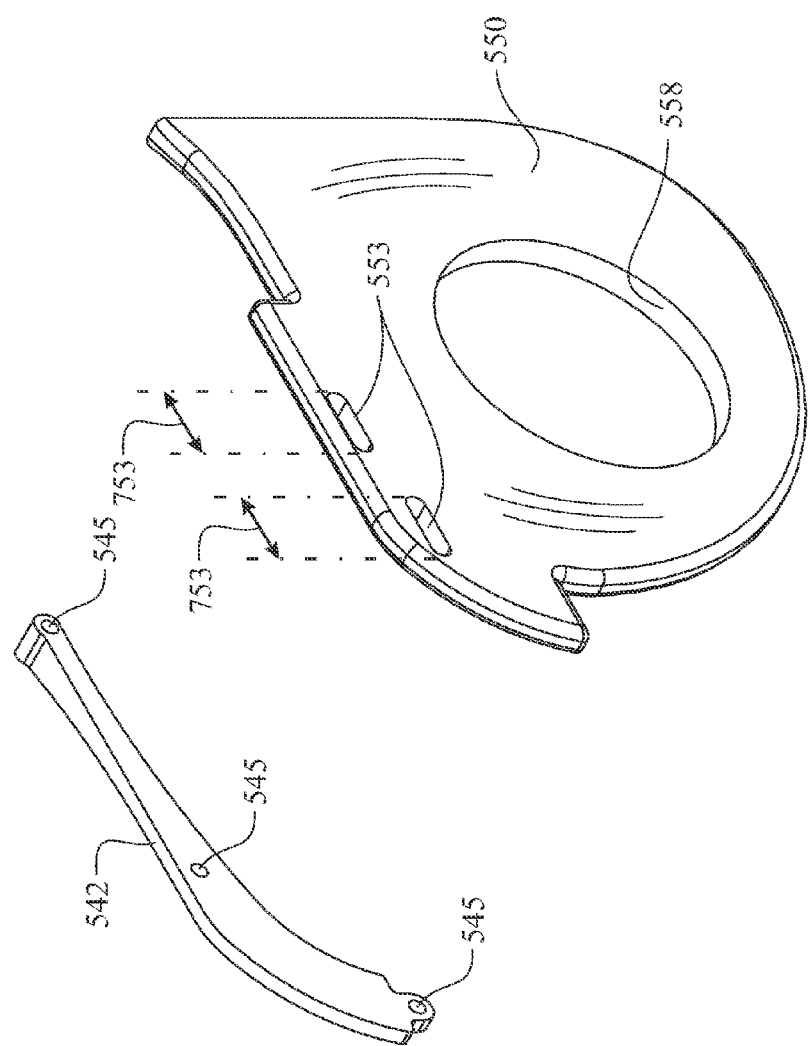
FIG. 21 presents an isometric front view detailing elements of a lens and associated lens retention element employed by the loupe lensed eyewear originally introduced in FIG. 15.
Figure 22:
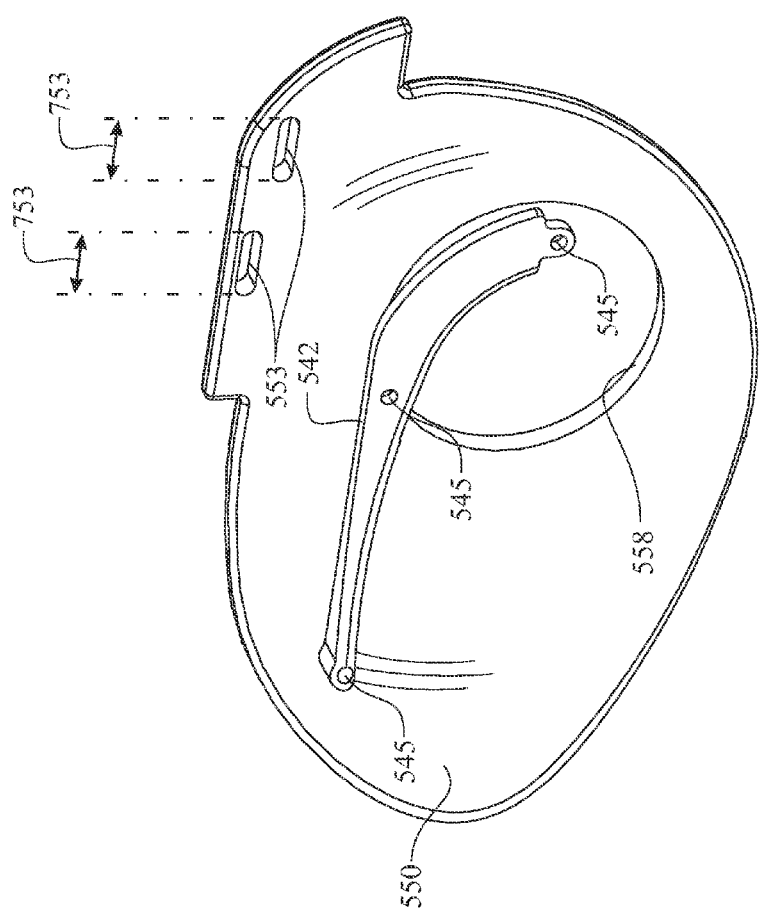
FIG. 22 presents an isometric rear view detailing elements of a lens and associated lens retention element employed by the loupe lensed eyewear originally introduced in FIG. 15.
Figure 23:
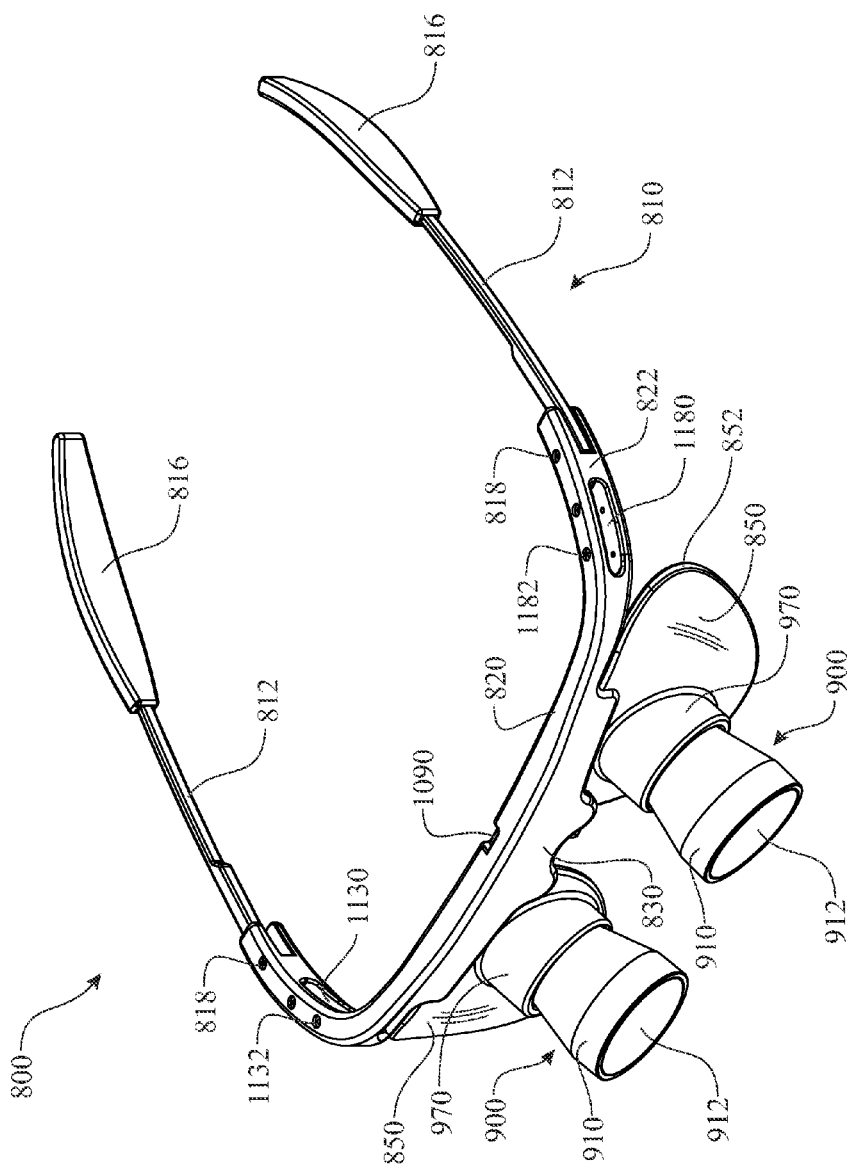
FIG. 23 presents an isometric front view introducing another exemplary embodiment of a loupe lensed eyewear in accordance with the present invention, wherein each loupe is removeably attached to each respective eyewear lens by an integral tubular loupe mounting bracket.
Figure 24:
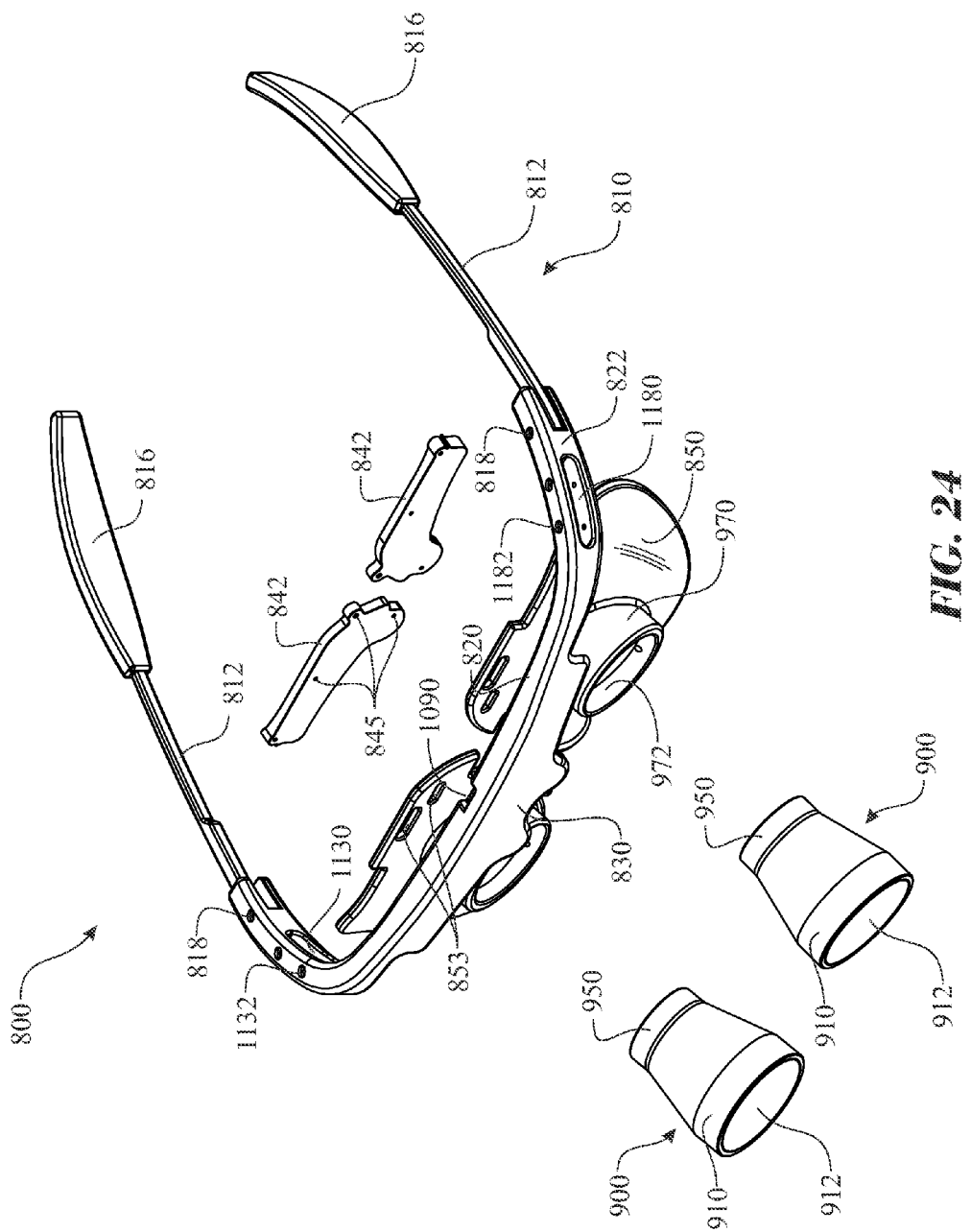
FIG. 24 presents an isometric front exploded assembly view of the loupe lensed eyewear introduced in FIG. 23.
Figure 25:
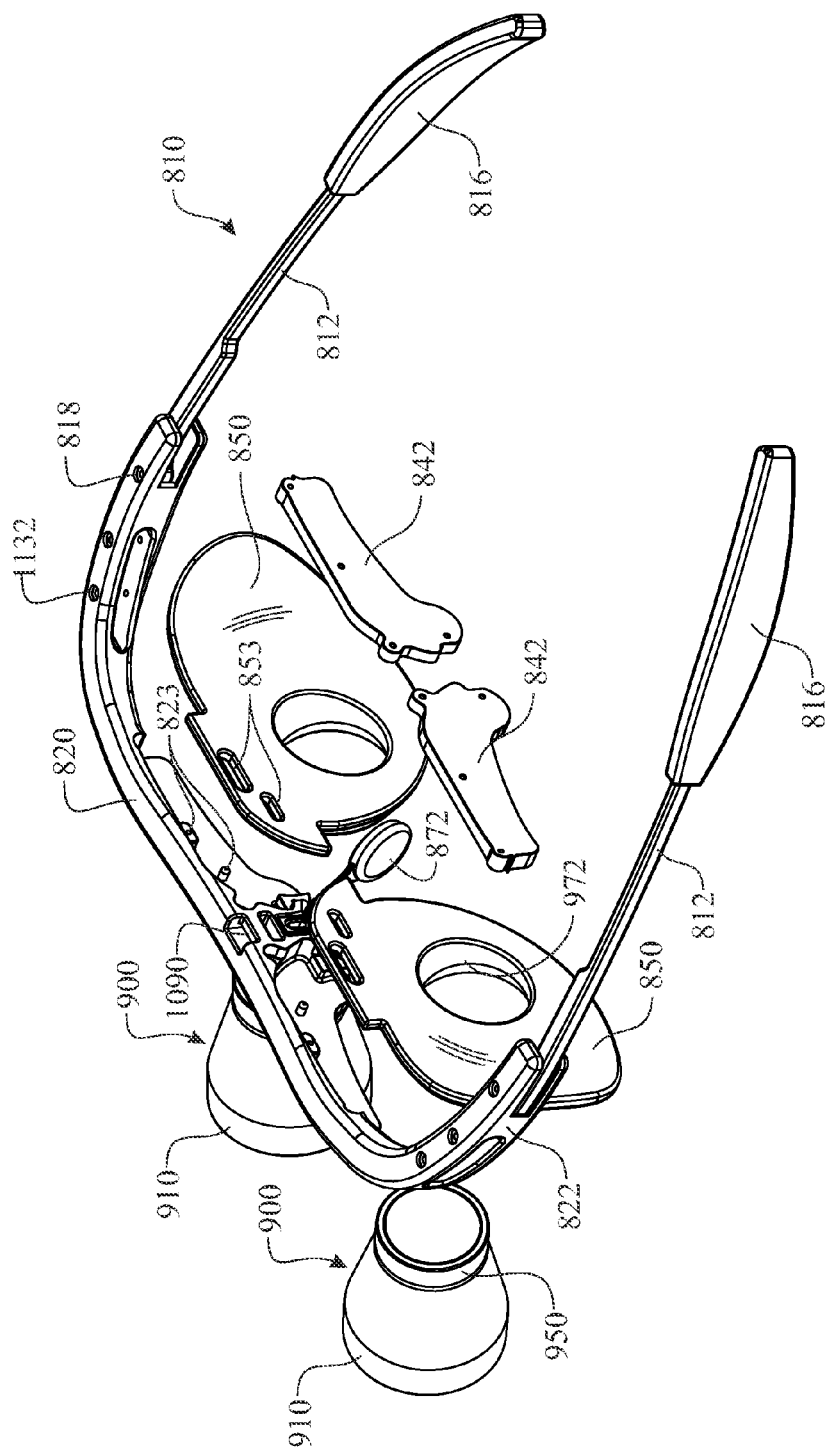
FIG. 25 presents an isometric rear exploded assembly view of the exemplary loupe lensed eyewear introduced in FIG. 23.

The lens supporting frame section 520 incorporates features enabling horizontal positioning of each eyewear lens 550, wherein the details are best shown in FIG. 19. Exemplary features include a lens receiving recess 521 for seating the eyewear lens 550, at least one lens positioning element 523 for vertically and rotationally retaining each eyewear lens 550, and at least one lens retention element assembly feature 525 for assembly of a lens retention element 542. The lens positioning element 523 can be formed as a plurality of pins (as shown) or provided as a single elongated member to retain a vertical and rotational relation between each eyewear lens 550 and the lens supporting frame section 520. Additionally or alternatively, an edge of the lens receiving recess 521 can provide the same function. At least one lens attachment and transverse mounting slot 553 is formed through each eyewear lens 550 as best shown in FIGS. 21 and 22. Each at least one lens attachment and transverse mounting slot 553 is located in alignment with a respective at least one lens positioning element 523. A lens adjusting slot width 753 of each lens attachment and transverse mounting slot 553 can define a lens travel distance 750. The lens travel distance 750 along the lens adjusting slot width 753 is shorted by the width of the lens positioning element 523 or any other outside interference. The exemplary embodiment utilizes a pair of lens positioning element 523 and mating lens attachment and transverse mounting slot 553 for each eyewear lens 550 to optimize the lens travel distance 750, while restricting any vertical or rotational motion of the eyewear lens 550. The eyewear lens 550 can move inward, reducing a span between the pair of lenses 550 in accordance with a lens inward motion 752. The eyewear lens 550 can move outward, increasing the span between the pair of lenses 550 in accordance with a lens outward motion 754. More specifically, the eyewear lens 550 would be restricted to a generally transverse direction extending between a nasal side of the lens rim 520 (proximate the frame bridge 530) and a temple side of the lens rim 520 (proximate the temple 510).

It is understood that the transverse mounting slot 553 can be integrated onto either the lens 550 or formed within the lens supporting frame section 520 and the associated lens positioning element 523 (protrusion) is integrated into the opposite element, being either the lens supporting frame section 520 or the lens 550 respectively.

The lens positioning feature, more specifically in the example, the lens positioning element 523 (protrusion) and the transverse mounting slot 553 are preferably designed incorporating features restricting the adjustability of each lens. Each transverse mounting slot 553 is defined by a major dimension and a minor dimension. Each lens positioning element 523 (protrusion) extending across a minor dimension of the slot and each pin has a dimension in the major direction that is smaller than the major dimension, wherein the geometry restricts motion of the lens positioning element 523 (protrusion) within the transverse mounting slot 553 along the minor dimension of the transverse mounting slot 553, while enabling adjustability of the position of the lens positioning element 523 (protrusion) within the transverse mounting slot 553 along the major dimension of the transverse mounting slot 553.

The lens retention element 542 is provided to apply a clamping force to the associated eyewear lens 550, wherein the clamping force retains the eyewear lens 550 at a fixed horizontal position. The at least one lens retention element assembly feature 525 can be of any suitable format for assembly of the lens retention element 542 to the lens supporting frame section 520. The exemplary embodiment includes a lens retention element assembly feature 525 located at each end of the lens receiving recess 521. Each lens retention element 542 is shaped to compliment the lens receiving recess 521. Each lens retention element 542 includes a lens retention element engaging aperture 545 in registration with each respective at least one lens retention element assembly feature 525.

The eyewear lens 550 is assembled to the lens supporting frame section 520 by seating the eyewear lens 550 within the lens receiving recess 521 and placing each lens attachment and transverse mounting slot 553 over each associated lens positioning element 523. The eyewear lens 550 is slideably positioned into the desired final location. The lens retention element 542 is assembled to the lens supporting frame section 520 by any suitable mechanical fastening form factor. In the exemplary embodiment, small screws can be inserted through each lens retention element engaging aperture 545 and threadably secured within the mating lens retention element assembly feature 525. The lens retention element 542 can be snugly tightened enabling fine adjustments to the position of the eyewear lens 550. Once the eyewear lens 550 is properly positioned, the screws can be further tightened to more permanently retain the eyewear lens 550 in the current lateral position. This configuration enables a horizontal positioning of each eyewear lens 550, thus locating each loupe subassembly 600 (represented by a convex surfaced coupling ring 650 and compression applying assembly ring 670) accordingly.

Vertical positioning of the loupe subassembly 600 can be accomplished by including an adjustable nose pad feature. The loupe lensed eyewear 500 presents a second exemplary variant enabling vertical positioning of the loupe subassembly 600. The adjustable nose pad feature employs an adjustable nose pad support frame 570, which is detailed in FIG. 20 and functionally illustrated in FIGS. 17 and 18. The adjustable nose pad support frame 570 includes a pair of nose pad frame downward extending segments 576 extending angularly downward from a nose pad frame attachment segment 572. A nose pad location adjustment segment 578 is formed at a distal end of each nose pad frame downward extending segment 576. A nose pad location adjustment slot 579 can be formed through each nose pad location adjustment segment 578 for attachment and vertical positioning of a mating nose pad (similar to the nose pad 172 presented above). A length of the nose pad location adjustment slot 579 would define upper and lower bounds of a nose pad travel distance 779. Alternatively, the nose pad can be integrated into a distal end of the nose pad frame downward extending segment 576, replacing the nose pad location adjustment segment 578.

Figure 17:
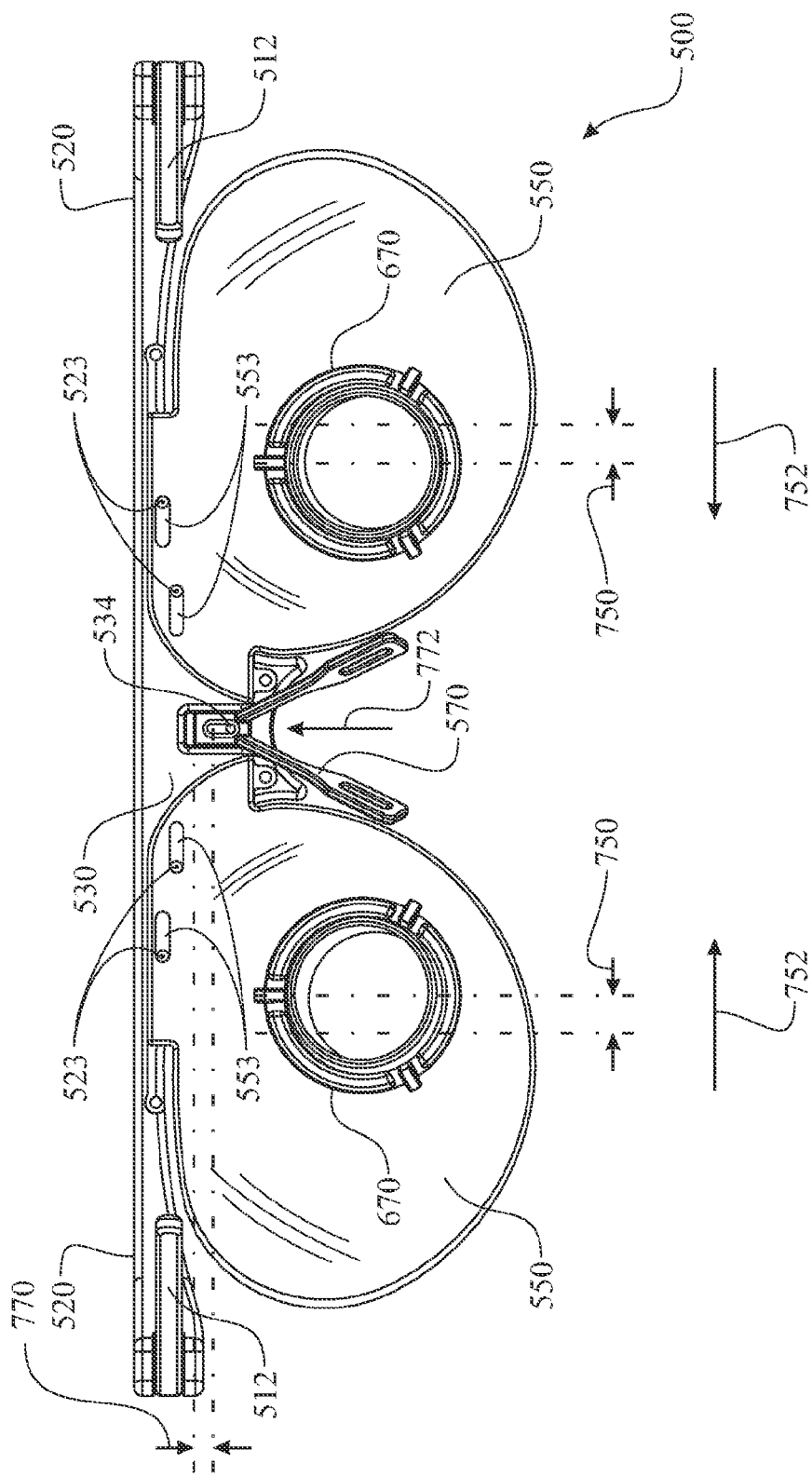
FIG. 17 presents a rear view of the loupe lensed eyewear originally introduced in FIG. 15, wherein the eyewear frame is shown in a contracted width configuration and the bridge section is configured in a minimum vertical position.
Figure 18:
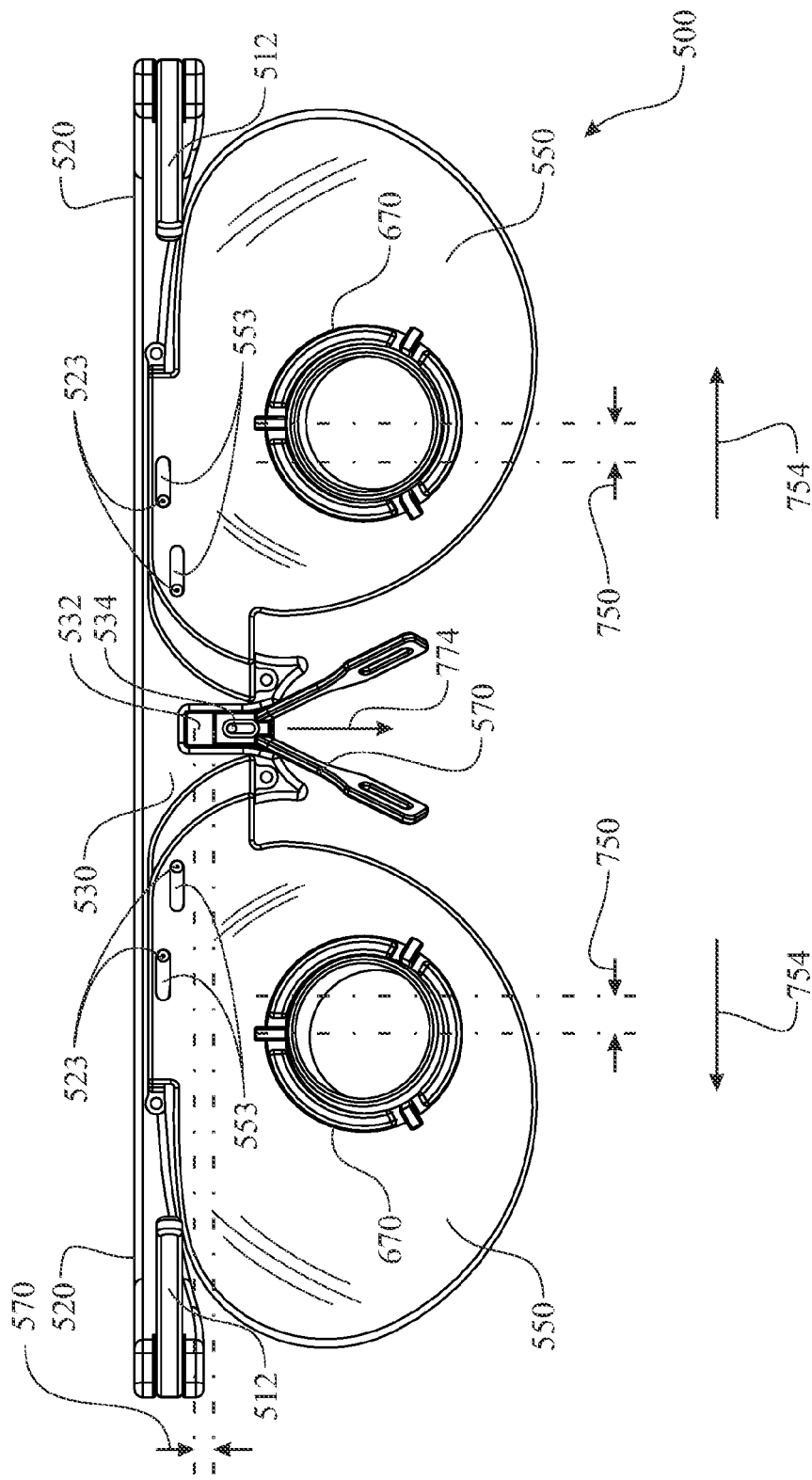
FIG. 18 presents a rear view of the loupe lensed eyewear originally introduced in FIG. 15, wherein the eyewear frame is shown in an expanded width configuration and the bridge section is configured in a maximum vertical position.

The adjustable nose pad support frame 570 can alternatively or additionally include a nose pad frame vertical adjustment slot 574 formed through the nose pad frame attachment segment 572 enabling vertical positioning of the adjustable nose pad support frame 570. A nose pad frame receiving channel 532 is formed within the frame bridge 530 for receiving the nose pad frame attachment segment 572. For an adjustable configuration, the nose pad frame receiving channel 532 is of a height enabling a vertical adjustment of the nose pad frame attachment segment 572 within the nose pad frame receiving channel 532. The nose pad frame vertical adjustment slot 574 would have a nose pad frame adjusting slot height 775 defining a nose pad support frame travel distance 770 (FIGS. 17 and 18). A nose pad frame positioning element 534 receives a vertical positioning retention element, such as a threaded fastener. The nose pad frame attachment segment 572 is seated within the nose pad frame receiving channel 532. The threaded fastener is inserted through the nose pad frame vertical adjustment slot 574 and threadably engaged with the nose pad frame positioning element 534. The threaded fastener is partially tightened enabling vertical motion of the nose pad frame attachment segment 572 within the nose pad frame receiving channel 532. The adjustable nose pad support frame 570 can be adjusted upwards in accordance with a nose pad support frame upward motion 772 (FIG. 17) or downwards in accordance with a nose pad support frame downward motion 774 (FIG. 18).

The threaded fastener is tightened when the adjustable nose pad support frame 570 is located in the desired final position properly positioning the loupe subassembly 600 in alignment with the user's eyes. A vertical adjustment slot countersink 575 can be included about a peripheral edge of the nose pad frame vertical adjustment slot 574 for recessing a head of the threaded fastener. Recessing the head of the threaded fastener can improve comfort to the wearer and reduce risk of injury such as abrasions, scratches, cut, and the like.

It is understood that the concept presented by the embodiments disclosed herein can be adapted using alternative configurations for adjusting a span between the pair of loupe subassemblies 200, a vertical position of the pair of loupe subassemblies 200, and other fitting adjustments.

Figure 27:
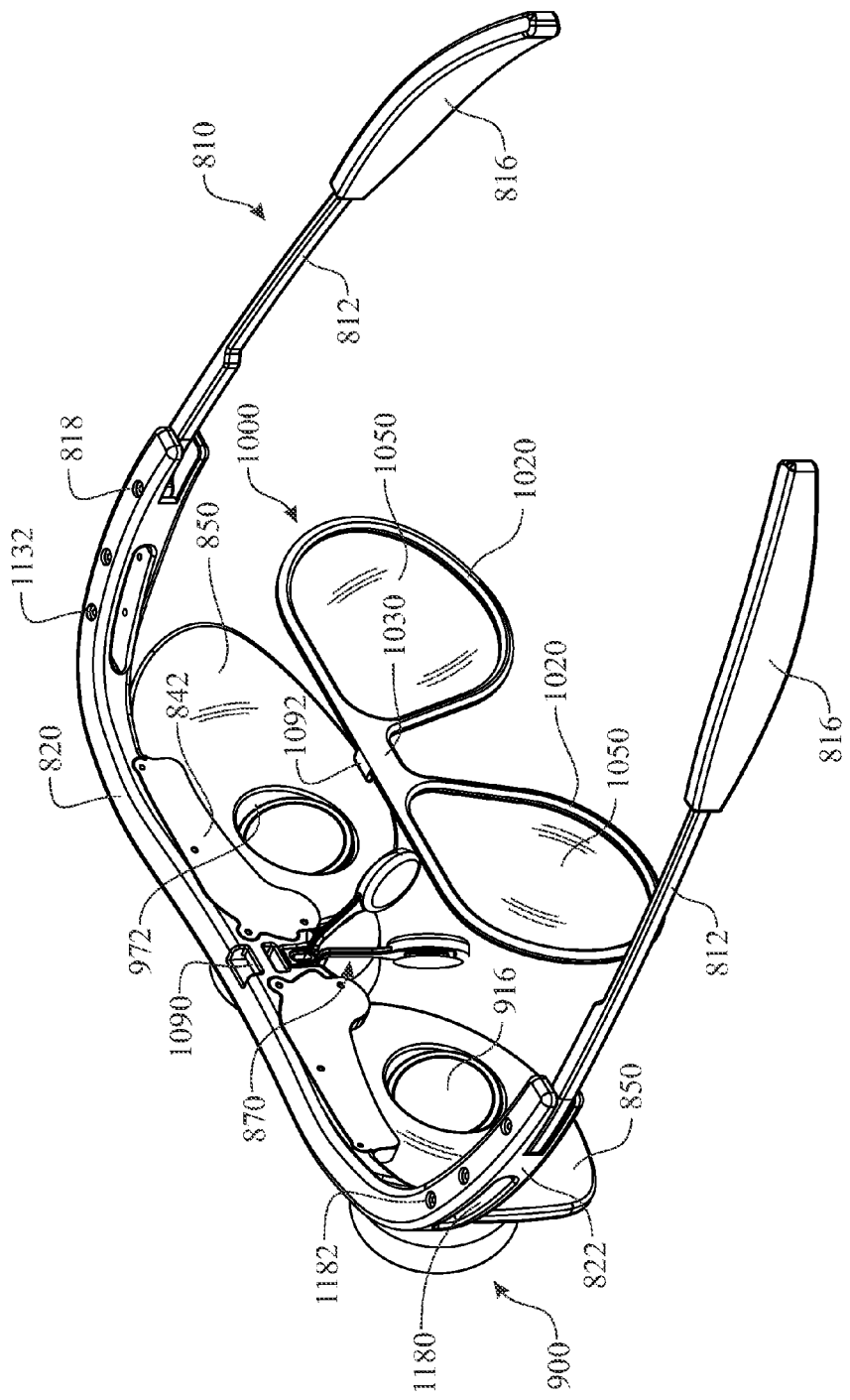
FIG. 27 presents an isometric rear exploded assembly view of the exemplary loupe lensed eyewear introducing an exemplary secondary or prescription eyewear subassembly.
Figure 28:
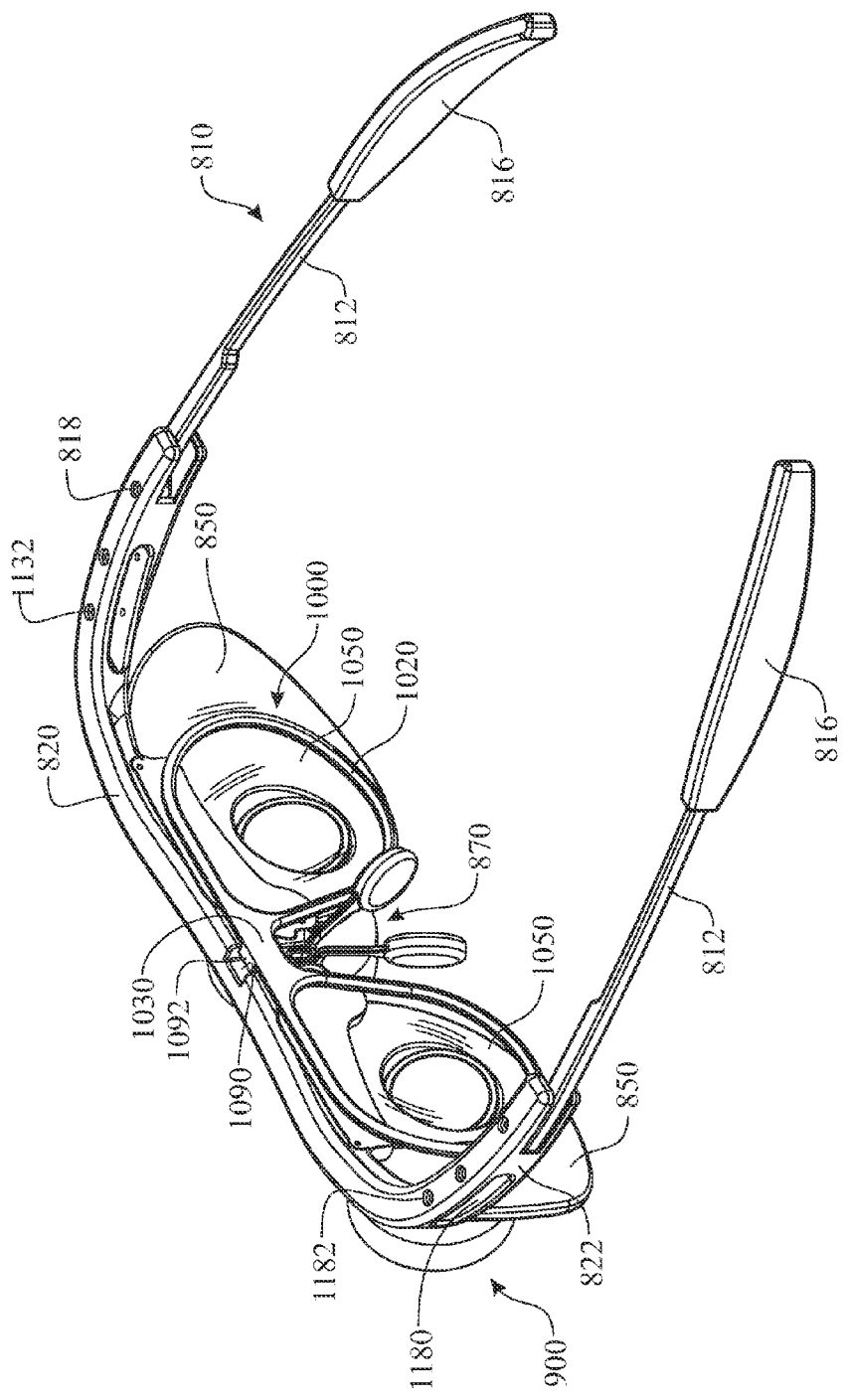
FIG. 28 presents an isometric rear assembly view illustrating the secondary or prescription eyewear subassembly assembled to the exemplary loupe lensed eyewear.
Figure 29:
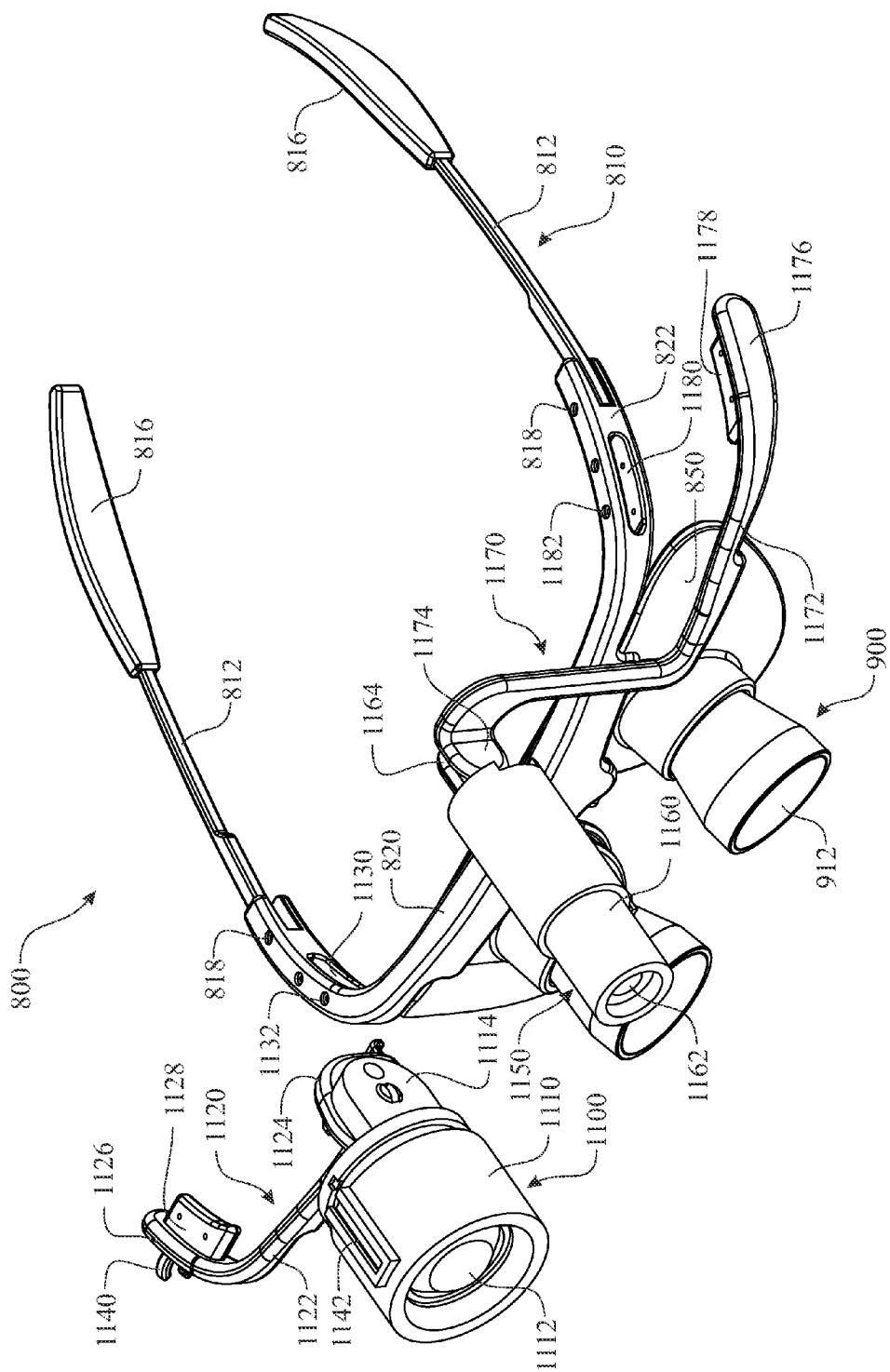
FIG. 29 presents an isometric front partially exploded assembly view of the exemplary loupe lensed eyewear introducing an exemplary camera subassembly and corresponding light subassembly.
Figure 30:
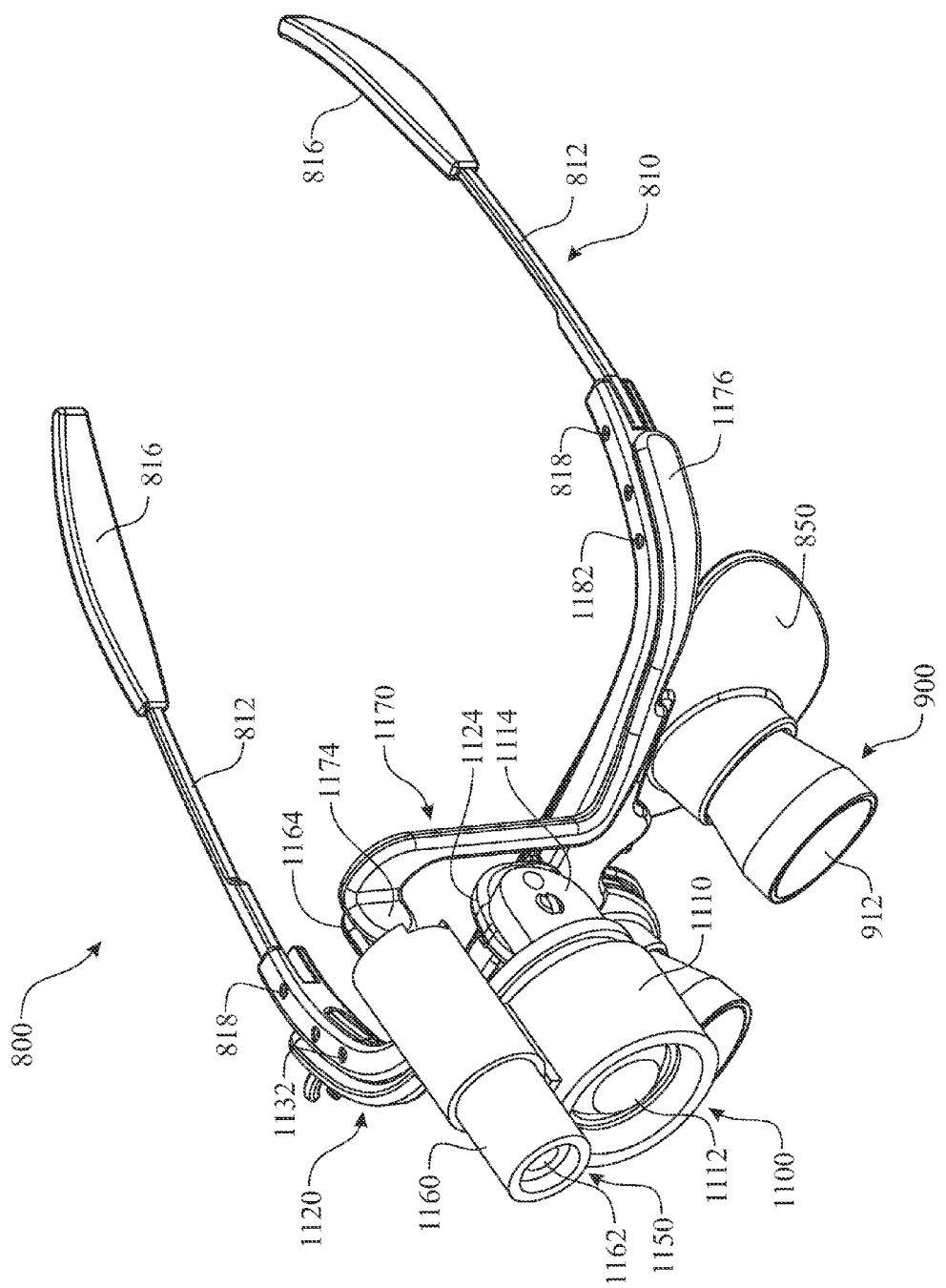
FIG. 30 presents an isometric front assembly view illustrating the exemplary camera subassembly and corresponding light subassembly assembled to the exemplary loupe lensed eyewear.

The loupe lensed eyewear 100 and loupe lensed eyewear 500 each employ a pivotally positionable assembly configuration for detachably assembling each loupe subassembly 200 to the respective lens 150, 550. In an alternate arrangement, each loupe subassembly 900 can be assembled to a lens 850 of a loupe lensed eyewear 800, as introduced in the illustration presented in FIGS. 23 through 26. The eyewear assembly comprises components associated with common eyewear, including a pair of temple assemblies 810 pivotally assembled to a lens frame subassembly. The exemplary lens frame subassembly includes a pair of lens supporting frame section 820 joined together by a frame bridge 830. The frame bridge 830 can be formed to include an integral nose pad or an adjustable nose pad support assembly 870 (FIGS. 27 and 28).

Each distal end of the lens frame subassembly defines an eyeglass frame end piece 822. Each exemplary temple assembly 810 can be fabricated having a temple tip 816 formed and/or attached to a distal or free end of a temple section 812. A pivot element is provided at each pivotal end of the temple section 812. Each temple assembly 810 is pivotally assembled to the respective eyeglass frame end piece 822 by inserting a hinge member 818 through the pivot element of the temple section 812. The pivotal end of the temple section 812 and the respective mating pivot providing segment of the eyeglass frame end piece 822 can include features to limit the rotation of the temple assembly 810 respective to the eyeglass frame end piece 822 to approximately a quarter circle or generally 90 degrees. Each temple tip 816 can be an integrally formed at a distal end of the temple section 812. The temple tip 816 can be fabricated of a secondary material that is either overmolded upon the distal end of the temple section 812, a secondary component that is subsequently assembled to the distal end of the temple section 812, or any other suitable design capable of providing the same functions. The temple tip 816 can be a rigid material, such as plastic, metal, and the like; a pliant material, such as silicone, rubber, nylon, and the like, a flexible spring material, such as a coil spring, and the like, or any other suitable material.

A pair of lenses 850 can be either rigidly or detachably assembled to each respective lens supporting frame section 820. Each lens 850 can be fabricated of a transparent material, a translucent material, or an opaque material. A tubular loupe mounting bracket 970 is integrally formed with each lens 850. The tubular loupe mounting bracket 970 is a tubular shape defines an interior surface referred to as a loupe coupling receptacle 972. An insertion end of the loupe coupling receptacle 972 can include a frustum shaped surface, referred to as a tapered coupling receptacle lead-in surface 973. Each lens 850 can be generally planar or include a curved distal side as shown in the exemplary embodiment, as best shown by a right lens 850 of FIG. 25.

In the detachable variant, the lens 850 is assembled to the lens supporting frame section 820 using a lens retention element 842. A lens retention element engaging aperture 845 and a series of fastening elements, such as a screw, a pin, or other elongated mechanical assembly element are used to assemble the lens 850 to the lens supporting frame section 820. Each fastening element is inserted through each respective lens retention element engaging aperture 845 of the lens retention element 842, continuing through each respective lens attachment and transverse mounting slot 853 of the lens 850 and into a lens positioning element 823 of the lens supporting frame section 820.

Figure 26:
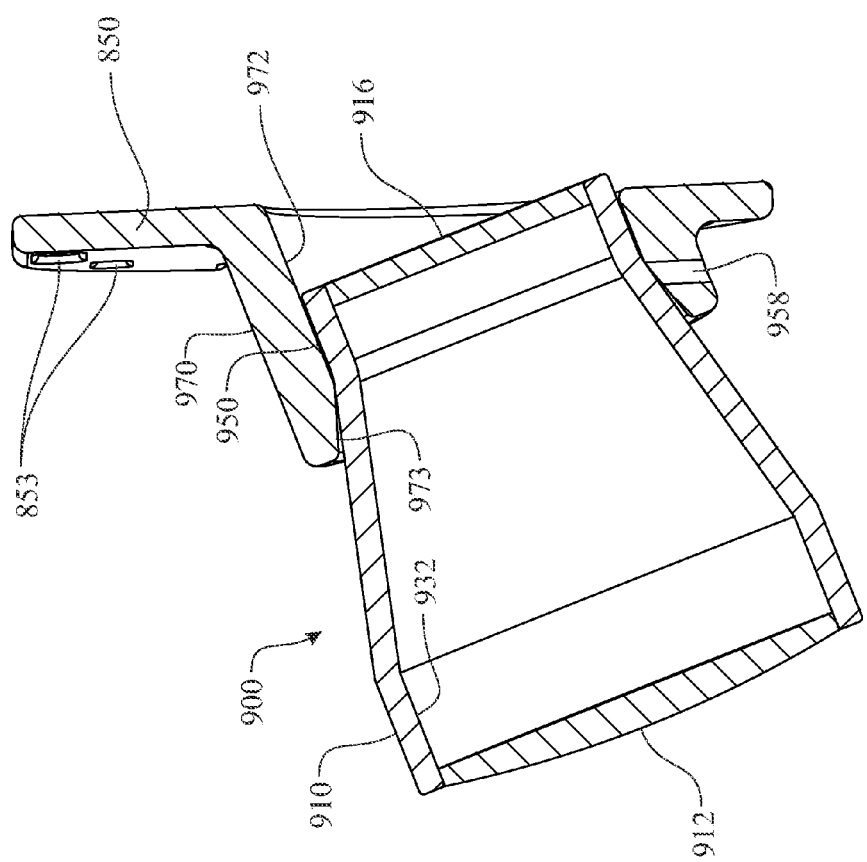
FIG. 26 presents a sectioned side elevation view detailing an assembly between the loupe and the integral tubular loupe mounting bracket.

The loupe lensed eyewear 800 comprises a pair of loupe subassemblies 900 assembled to eyewear by way of a tubular loupe mounting bracket 970, wherein each tubular loupe mounting bracket 970 is integral with each respective lens 850, as best illustrated in a section view presented in FIG. 26. Each loupe subassembly 900 includes a series of lenses, including an object lens 912, an eyepiece lens 916, and any additional intermediary lenses. The series of lenses are assembled within the loupe barrel interior surface or against a lens supporting surface 932. It is understood that each lens 912, 916 would be assembled to the lens supporting surface 932 in accordance with any suitable lens assembly design and/or process. The tubular loupe barrel 910 can have a uniform cross sectional shape extending a length of the loupe barrel 910 or if the lenses vary in diameter, the tubular loupe barrel 910 can have a changing cross sectional shape, wherein the interior and exterior form a hollow frustum shape. A loupe coupling tube 950 is formed at an attachment end of the loupe barrel 910. The loupe coupling tube 950 is sized and shaped to insertably mate with the loupe coupling receptacle 972 of the tubular loupe mounting bracket 970. A tapered coupling receptacle lead-in surface 973 can be formed at a distal or free end of the tubular loupe mounting bracket 970. The tapered coupling receptacle lead-in surface 973 provides several functions, including an assistant or guide for insertion of the loupe coupling tube 950 into the loupe coupling receptacle 972, compensation of the frustum shaped outer surface of the loupe barrel 910, and the like. The loupe coupling tube 950 of the loupe barrel 910 is slideably inserted into the loupe coupling receptacle 972. The loupe subassembly 900, by way of the loupe coupling tube 950, is retained within the loupe coupling receptacle 972 by a loupe barrel retention element feature 958. The loupe barrel retention element feature 958 can be of any suitable form factor capable of temporarily retaining the loupe coupling tube 950 within the loupe coupling receptacle 972. In the exemplary embodiment, a set screw (not shown) is threadably inserted through a threaded retention hole. The ability to remove and replace each loupe subassembly 900 introduces a number of advantages, including flexibility of the magnification between exchanged loupes, repair and replacement of each loupe assembly 900, a reduced cost to the user, reduced delivery time of the eyewear to the user, and the like.

Each lens 850 is removably assembled to an interior surface of the lens supporting frame section 820. Each lens 850 includes a series of lens attachment and transverse mounting slots 853. A lens retention element 842 is placed on against an opposite side of the lens 850, sandwiching the lens 850 between the lens supporting frame section 820 and the lens retention element 842. The lens supporting frame section 820 and/or the lens retention element 842 can include one or more protrusions, such as pins. The lens retention element 842 can include one or more lens retention element engaging apertures 845, wherein each lens retention element engaging aperture 845 is located in registration with each respective lens attachment and transverse mounting slot 853 and each respective lens positioning element 823. The lens positioning element 823 can be formed as a pin or protrusion, a threaded receptacle, or any other suitable mechanical fastening element. A mechanical fastener, such as a threaded fastener, can be inserted through the respective lens retention element engaging aperture 845, passing through the respective lens attachment and transverse mounting slot 853 and secured into the associated lens positioning element 823. In a variant where the lens positioning element 823 is a pin, the lens positioning element 823 is positioned extending through the lens attachment and transverse mounting slot 853. A mating mechanical fastener, preferably a threaded fastener, is inserted through the lens retention element engaging aperture 845 and mated with the lens positioning element 823. Each lens attachment and transverse mounting slot 853 is elongated, enabling positional adjustment of the lens 850 along a span of the lens supporting frame section 820. A compressive force generated by the mechanical fastener creates a frictional force, retaining the lens 850 in a desired position. Additional features of the assembly of the lens 850 to the lens supporting frame section 820 are similar to those of the assembly of the lens 550 to the lens supporting frame section 520 described above.

The loupe lensed eyewear 800 can include a fixed nose pad element or an adjustable nose pad support assembly 870 as best shown in FIG. 27. The adjustable nose pad support assembly 870 is similar to the adjustable nose pad support frame 570 described above.

Any of a variety of accessories can be integrated into the loupe lensed eyewear 800. A first exemplary accessory is a secondary or prescription eyewear subassembly 1000, which is illustrated in FIGS. 27 and 28. The secondary or prescription eyewear subassembly 1000 enables temporary attachment of a secondary set of lenses 1050; generally being a set of prescription lenses 1050 to be removably attached to the lens supporting frame section 820. The lenses 1050 can be prescription, protective lenses, tinted lenses, or any other desired type of lens. This increases a flexibility of the loupe lensed eyewear 800 to the end user. Each lens of the secondary set of lenses 1050 are carried by a secondary eyewear frame 1020. The pair of secondary eyewear frames 1020 are joined together by a secondary eyewear frame bridge 1030. At least one secondary eyewear subassembly attachment featuring 1092 is integrated into the secondary eyewear frame 1020 and/or the secondary eyewear frame bridge 1030 for temporary attachment to the lens supporting frame section 820. At least one secondary eyewear subassembly receiving featuring 1090 is formed within or carried by the lens supporting frame section 820. The secondary eyewear subassembly receiving featuring 1090 and secondary eyewear subassembly attachment featuring 1092 provide a temporary mating capability to temporarily attach the secondary or prescription eyewear subassembly 1000 to the lens supporting frame section 820. In the exemplary embodiment, the secondary eyewear subassembly attachment featuring 1092 is a receptacle and the secondary eyewear subassembly receiving featuring 1090 is a plug or insert. The preferred embodiment employs a half-blind dovetail configuration, wherein the secondary eyewear subassembly receiving featuring 1090 is provided as a dovetail socket and the secondary eyewear subassembly attachment featuring 1092 is provided as a dovetail pin. The dovetail pin is slid vertically into the dovetail socket. The dovetail shape retains the secondary eyewear subassembly attachment featuring 1092 within the secondary eyewear subassembly receiving featuring 1090. The secondary or prescription eyewear subassembly 1000 would be separated from the lens supporting frame section 820 by sliding the secondary eyewear subassembly attachment featuring 1092 vertically upward (against gravity). The curved shape of each of the lenses 850 would be such to provide adequate clearance for the secondary or prescription eyewear subassembly 1000.

It is understood that the shape of each secondary eyewear frame 1020 and the configuration for carrying the secondary eyewear lens 1050 can be of any known eyewear design. This can include an overmolded configuration, an open loop that is joined by a threaded fastener, and the like.

Although a half blind dovetail is described herein, it is understood that the secondary eyewear subassembly receiving featuring 1090 and mating secondary eyewear subassembly attachment featuring 1092 can be a magnetic coupling, a snap coupling, and the like. The inclusion of a separate secondary or prescription eyewear subassembly 1000 introduces a number of advantages over currently available loupe supporting eyewear. One advantage is an ability to replace the prescription lens portion of the loupe lensed eyewear 800 without any loss of use of the loupe lensed eyewear 800 currently on hand. The user would simply procure a replacement secondary or prescription eyewear subassembly 1000 and seamlessly replace the old secondary or prescription eyewear subassembly 1000 with the new secondary or prescription eyewear subassembly 1000. This option additionally reduces an overall cost of ownership of the loupe lensed eyewear 800, as the lenses 850 would not have to be replaced to accommodate changes in the user's prescriptions over time. The loupe lensed eyewear 800 would be a standard, off the shelf design for all users. The customization would be limited to the secondary or prescription eyewear subassembly 1000. This reduces overall costs to the manufacturer resulting in reduced costs to the consumer. An offering of a flexible, standard design converts a once custom process taking long periods of time for delivery to an immediate availability of the loupe lensed eyewear 800.

The loupe lensed eyewear 800 can include a camera and an associated light emitting assembly. One variant is presented in FIGS. 7 through 11 above. The loupe lensed eyewear 800 introduces another variant, employing a detachable camera mounting arm 1120 and a detachable light mounting arm 1170. A camera accessory 1100 is carried by the camera mounting arm 1120. preferably in a pivotal arrangement. The camera accessory 1100 includes a camera body 1110 carrying a camera lens 1112. A camera pivot mount 1114 is provided at an attachment end of the camera body 1110. The camera mounting arm 1120 includes a camera mounting arm attachment segment 1126 formed at an eyewear frame attachment end of a camera mounting arm frame 1122 and a camera mounting arm pivot mount section 1124 (or other attachment bracket) at a camera attachment end of the camera mounting arm frame 1122. The camera pivot mount 1114 is pivotally joined to the camera mounting arm pivot mount section 1124 of the camera mounting arm 1120. A camera mounting arm attachment tab 1128 (or other attachment feature) is provided at the camera mounting arm attachment segment 1126 of the camera mounting arm 1120. The camera mounting arm 1120 is detachably assembled to the lens supporting frame section 820 by inserting the camera mounting arm attachment tab 1128 into a camera mounting arm attachment slot 1130 formed within the eyeglass frame end piece 822 of the loupe lensed eyewear 800. A camera mounting arm retention feature 1132 is employed to retain the camera mounting arm attachment tab 1128 within the camera mounting arm attachment slot 1130. The camera mounting arm retention feature 1132 can be of any suitable form factor, including one or more set screws, a biased bearing, and the like.

Similarly, a light accessory 1150 is carried by the light mounting arm 1170. preferably in a pivotal arrangement. The light accessory 1150 includes a light body 1160 carrying a light lens 1162. A light pivot mount 1164 is provided at an attachment end of the light body 1160. The light mounting arm 1170 includes a light mounting arm attachment segment 1176 formed at an eyewear frame attachment end of a light mounting arm frame 1172 and a light mounting arm pivot mount section 1174 (or other attachment bracket) at a light assembly attachment end of the light mounting arm frame 1172. The light pivot mount 1164 is pivotally joined to the light mounting arm pivot mount section 1174 of the light mounting arm 1170. A light mounting arm attachment tab 1178 (or other attachment feature) is provided at the light mounting arm attachment segment 1176 of the light mounting arm 1170. The light mounting arm 1170 is detachably assembled to the lens supporting frame section 820 by inserting the light mounting arm attachment tab 1178 into a light mounting arm attachment slot 1180 formed within the eyeglass frame end piece 822 of the loupe lensed eyewear 800. A light mounting arm retention feature 1182 is employed to retain the light mounting arm attachment tab 1178 within the camera mounting arm attachment slot 1130. The light mounting arm retention feature 1182 can be of any suitable form factor, including one or more set screws, a biased bearing, and the like. The camera mounting arm 1120 locates the camera accessory 1100 in a position on the lens supporting frame section 820 directing the camera lens 1112 at a focal point that is centered respective to the pair of lenses 850. Similarly, the light mounting arm 1170 locates the light accessory 1150 in a position on the lens supporting frame section 820 directing the light lens 1162 towards a focal point of the camera lens 1112, thus providing sufficient light for operation of the camera lens 1112.

The camera lens 1112 preferably obtains digital images. The digital images can be saved within the camera lens 1112, on a digital memory device separate from the camera lens 1112, but integrated within the loupe lensed eyewear 800, remotely, where the data is transferred from the camera lens 1112 to the remote data storage device by a cable or a wireless communication, such as Wi-Fi, Bluetooth, or any other suitable wireless protocol.

The camera and lighting accessory can be enhanced by an inclusion of any of several optional features. An accessory clip 1140 can be integrated into the camera mounting arm 1120 (as shown) and/or the light mounting arm 1170. It is also understood that the accessory clip 1140 can be integrated directly to the lens supporting frame section 820, the eyeglass frame end piece 822, the temple section 812, or any other suitable element of the loupe lensed eyewear 800. The accessory clip 1140 enables temporary retention of cables, lights, or other accessories. A second optional feature, a light registration bracket 1142, provides a mechanism for temporarily joining the camera accessory 1100 and the light accessory 1150 together. The light registration bracket 1142 can be provided in any suitable mechanical assembly configuration capable of joining two mechanical housings together.

Although the illustrated exemplary embodiment locates the light accessory 1150 above the camera accessory 1100, it is understood that the light accessory 1150 can be below or on either side of the camera accessory 1100. It is also understood that the eyewear 800 can include an accessory comprising multiple light accessories 1150 to aid in optimizing illumination of the area and/or multiple camera accessories 1100 enabling stereo.

The disclosure describes several configurations for attaching each loupe subassembly 200, 900 to the respective lens 150, 850. Broadly, each lens comprises a loupe receiving feature and each loupe subassembly 200, 900 comprises a loupe attachment feature wherein the loupe attachment feature is assembled to the loupe receiving feature.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

| Element Description References | |
|---|---|
| Ref. No. | Description |
| 100 | loupe lensed eyewear |
| 110 | telescoping temple |
| 112 | forward temple section |
| 113 | channel |
| 114 | rear temple section |
| 115 | finger |
| 116 | temple tip |
| 118 | hinge |
| 119 | telescoping temple retention element |
| 120 | end piece |
| 122 | eye wire or rim |
| 130 | frame bridge |
| 132 | first telescoping bridge segment |
| 134 | telescope slot |
| 136 | telescope slot proximal end |
| 137 | telescope slot distal end |
| 138 | telescoping bridge retention element receptacle |
| 139 | retention element receptacle threading |
| 142 | second telescoping bridge segment |
| 144 | telescoping tongue segment |
| 146 | telescoping tongue segment distal end |
| 147 | telescoping tongue segment proximal end |
| 150 | lens |
| 152 | lens peripheral edge |
| 154 | lens exterior surface |
| 156 | lens interior surface |
| 158 | loupe receiving aperture |
| 160 | telescoping bridge retention element |
| 162 | retention element tool receptacle |
| 164 | retention element threading |
| 166 | retention element engaging end |
| 170 | adjustable nose pad assembly |
| 172 | nose pad |
| 174 | nose pad attachment arm |
| 175 | nose pad threaded receptacle |
| 176 | nose pad location adjustment member |
| 178 | nose pad location adjustment channel |
| 179 | nose pad location adjustment slot |
| 180 | nose pad location retention element |
| 182 | nose pad retention head |
| 184 | nose pad retention element tool receptacle |
| 185 | nose pad retention element threading |
| 200 | loupe subassembly |
| 210 | optical barrel subassembly |
| 212 | object lens |
| 213 | object lens peripheral edge |
| 214 | intermediary lens |
| 215 | intermediary lens peripheral edge |
| 216 | eyepiece lens |
| 217 | eyepiece lens peripheral edge |
| 220 | object lens barrel |
| 222 | object lens barrel body |
| 224 | object lens barrel body exterior surface |
| 226 | lens assembly and focal control element |
| 228 | control element cantilever slot |
| 230 | object lens retainer |
| 232 | object lens radial retention seat |
| 234 | object lens axial retention seat |
| 240 | eyepiece lens barrel |
| 242 | eyepiece lens barrel body |
| 242 | eyepiece lens barrel body |
| 244 | overlapping barrel segment |
| 246 | overlapping barrel segment interior surface |
| 250 | convex surfaced coupling ring |
| 252 | eyepiece lens radial retention seat |
| 260 | barrel central support ring |
| 270 | compression applying assembly ring |
| 272 | loupe assembly ring expansion segment |
| 272 | loupe assembly ring expansion segment |
| 274 | loupe assembly ring inner surface |
| 276 | loupe assembly ring expansion slots |
| 278 | loupe assembly ring threaded segment |
| 279 | loupe assembly ring axial retention feature |
| 280 | assembly ring fastener |
| 282 | assembly ring fastener peripheral surface |
| 282 | assembly ring fastener peripheral surface |
| 288 | assembly ring fastener threaded inner surface |

-continued

Element Description References

| Ref. No. | Description |
|---|---|
| 289 | assembly ring fastener contacting edge surface |
| 290 | loupe gasket |
| 292 | loupe gasket outer circumference |
| 294 | loupe gasket inner circumference |
| 300 | camera accessory |
| 310 | camera mounting frame |
| 312 | power and electronics housing |
| 313 | bracket clamping element |
| 314 | camera mounting frame vertical segment |
| 316 | camera mounting frame horizontal segment |
| 318 | camera housing pivot bushing |
| 320 | camera subassembly |
| 322 | camera housing |
| 324 | camera housing retention element |
| 330 | camera and lens combination |
| 332 | light emitting element |
| 410 | bridge telescoping motion |
| 412 | bridge telescoped span |
| 414 | temple telescoping motion |
| 416 | temple telescoped span |
| 430 | camera rotational motion |
| 500 | loupe lensed eyewear |
| 510 | temple |
| 512 | temple arm |
| 518 | hinge |
| 520 | lens supporting frame section |
| 521 | lens receiving recess |
| 523 | lens positioning element |
| 525 | lens retention element assembly feature |
| 530 | frame bridge |
| 532 | nose pad frame receiving channel |
| 534 | nose pad frame positioning element |
| 542 | lens retention element |
| 545 | lens retention element engaging aperture |
| 550 | lens |
| 553 | lens attachment and transverse mounting slot |
| 554 | lens exterior surface |
| 556 | lens interior surface |
| 558 | loupe receiving aperture |
| 570 | adjustable nose pad support frame |
| 572 | nose pad frame attachment segment |
| 574 | nose pad frame vertical adjustment slot |
| 575 | vertical adjustment slot countersink |
| 576 | nose pad frame downward extending segment |
| 578 | nose pad location adjustment segment |
| 579 | nose pad location adjustment slot |
| 650 | convex surfaced coupling ring |
| 670 | compression applying assembly ring |
| 750 | lens travel distance |
| 752 | lens inward motion |
| 753 | lens adjusting slot width |
| 754 | lens outward motion |
| 770 | nose pad support frame travel distance |
| 772 | nose pad support frame upward motion |
| 774 | nose pad support frame downward motion |
| 775 | nose pad frame adjusting slot height |
| 779 | nose pad travel distance |
| 800 | loupe lensed eyewear |
| 810 | temple assembly |
| 812 | temple section |
| 816 | temple tip |
| 818 | hinge member |
| 820 | lens supporting frame section |
| 822 | eyeglass frame end piece |
| 823 | lens positioning element |
| 830 | frame bridge |
| 842 | lens retention element |
| 845 | lens retention element engaging aperture |
| 850 | lens |
| 853 | lens attachment and transverse mounting slot |
| 870 | adjustable nose pad support assembly |
| 900 | loupe subassembly |
| 910 | loupe barrel |
| 912 | object lens |
| 916 | eyepiece lens |

-continued

Element Description References

| Ref. No. | Description |
|---|---|
| 932 | lens supporting surface |
| 950 | loupe coupling tube |
| 958 | loupe barrel retention element feature |
| 970 | tubular loupe mounting bracket |
| 972 | loupe coupling receptacle |
| 973 | tapered coupling receptacle lead-in surface |
| 1000 | secondary or prescription eyewear subassembly |
| 1020 | secondary eyewear frame |
| 1030 | secondary eyewear frame bridge |
| 1050 | secondary eyewear lens |
| 1090 | secondary eyewear subassembly receiving featuring |
| 1092 | secondary eyewear subassembly attachment featuring |
| 1100 | camera accessory |
| 1110 | camera body |
| 1112 | camera lens |
| 1114 | camera pivot mount |
| 1120 | camera mounting arm |
| 1122 | camera mounting arm frame |
| 1124 | camera mounting arm pivot mount section |
| 1126 | camera mounting arm attachment segment |
| 1128 | camera mounting arm attachment tab |
| 1130 | camera mounting arm attachment slot |
| 1132 | camera mounting arm retention feature |
| 1140 | accessory clip |
| 1142 | light registration bracket |
| 1150 | light accessory |
| 1160 | light body |
| 1162 | light lens |
| 1164 | light pivot mount |
| 1170 | light mounting arm |
| 1172 | light mounting arm frame |
| 1174 | light mounting arm pivot mount section |
| 1176 | light mounting arm attachment segment |
| 1178 | light mounting arm attachment tab |
| 1180 | light mounting arm attachment slot |
| 1182 | light mounting arm retention feature |

What is claimed is:

1. An adaptable loupe supporting eyewear, the eyewear comprising:

eyewear comprising a pair of lens rims joined together by a frame bridge;

a pair of eyewear lenses, each eyewear lens carried by a respective lens rim of said pair of lens rims, each eyewear lens including a loupe receiving feature passing therethrough, wherein each loupe receiving feature is adapted to receive a loupe;

a pair of loupes, each loupe comprising a loupe barrel and a series of loupe lenses adapted for magnification of an image of an object, said loupe barrel having a tubular structure defining a loupe lens supporting interior and an exterior surface, said exterior surface including a loupe attachment feature, wherein said series of loupe lenses is carried by said loupe lens supporting interior of each respective loupe, wherein each loupe attachment feature is assembled to said respective loupe receiving feature, each loupe attachment feature includes an omni-directional loupe mount system, the omni-directional loupe mount system comprising:

a convex surfaced coupling ring carried at an attachment end of said loupe barrel, and a compression applying assembly ring having a concave loupe assembly ring inner surface, wherein said omni-directional loupe mount omni-directionally pivotally assembles each said loupe barrel to said respective eyewear lens of said pair of eyewear lenses, wherein said concave loupe assembly ring inner surface applies a compression force to said convex surfaced coupling ring, retaining said respective loupe in a fixed orientation, and an eyewear lens positioning feature enabling each eyewear lens to be adjustably positioned within each lens rim to align each loupe with an associated eye of a user.

2. The adaptable loupe supporting eyewear as recited in claim 1, said eyewear lens positioning feature further comprising features restricting said adjustability of each eyewear lens to a generally transverse direction extending between a nasal side of said lens rim and a temple side of said lens rim.

3. The adaptable loupe supporting eyewear as recited in claim 1, said eyewear lens positioning feature comprising a slot and protrusion combination, wherein one of said slot and protrusion is integrated into said eyewear lens and said other of said slot and protrusion is integrated into said lens rim, wherein when assembled, said protrusion is inserted through said slot.

4. The adaptable loupe supporting eyewear as recited in claim 3, said eyewear lens positioning feature further comprising features restricting said adjustability of each eyewear lens, wherein each slot is defined by a major slot dimension and a minor slot dimension wherein said major slot dimension is larger than said minor slot dimension, wherein each protrusion extends across a span defining said minor slot dimension and each protrusion has a major protrusion dimension in a direction of said major slot dimension, wherein said major protrusion dimension is smaller than said major slot dimension, wherein said geometry restricts motion of said protrusion within said slot along said minor slot dimension, while enabling adjustability of said position of said protrusion within said slot along said major dimension of said slot.

5. The adaptable loupe supporting eyewear as recited in claim 1, further comprising a pair of eyewear lens retention elements, wherein each eyewear lens is sandwiched between each eyewear lens retention element of said pair of eyewear lens retention elements and each lens rim of said pair of lens rims.

6. The adaptable loupe supporting eyewear as recited in claim 1, further comprising an eyewear lens receiving recess formed in each lens rim of said pair of lens rims, wherein each eyewear lens receiving recess is shaped to receive and enable position adjustability of said associated eyewear lens.

7. The adaptable loupe supporting eyewear as recited in claim 1, wherein said loupe is adapted to be removed and replaced using a mechanical assembly configuration provided to removably attach said loupe receiving feature and said loupe attachment feature to one another.

8. The adaptable loupe supporting eyewear as recited in claim 1, each eyewear lens having an arch formed therein extending said eyewear lens at least partially rearward as said eyewear lens approaches each temple.

9. The adaptable loupe supporting eyewear as recited in claim 1, further comprising at least one of a camera and a light emitting device assembled thereto.

10. An adaptable loupe supporting eyewear, said eyewear comprising:

a pair of loupes, each loupe comprising a loupe barrel and a series of loupe lenses to magnified an image of an object, said loupe barrel having a tubular structure defining a loupe lens supporting interior and an exterior surface, said exterior surface including a loupe coupling tube, wherein said series of loupe lenses is carried by said loupe lens supporting interior of each respective loupe, eyewear comprising a pair of lens rims joined together by a frame bridge;

a pair of eyewear lenses, each eyewear lens carried by a respective lens rim of said pair of lens rims, each eyewear lens including a tubular loupe mounting bracket extending angularly forward therefrom, said tubular loupe mounting bracket having an interior wall defining a loupe coupling receptacle wherein said loupe coupling receptacle is adapted to receive each loupe with an associated eye of a user;

each loupe attachment feature includes an omni-directional loupe mount system, the omni-directional loupe mount system comprising:

a convex surfaced coupling ring carried at an attachment end of said loupe barrel, and a compression applying assembly ring having a concave loupe assembly ring inner surface, wherein said omni-directional loupe mount omni-directionally pivotally assembles each said loupe barrel to said respective eyewear lens of said pair of eyewear lenses, wherein said concave loupe assembly ring inner surface applies a compression force to said convex surfaced coupling ring, retaining said respective loupe in a fixed orientation, and wherein said loupe coupling tube is slideably inserted into and detachably mechanically retained within said loupe coupling receptacle.

11. The adaptable loupe supporting eyewear as recited in claim 10, said mechanically retained includes a threaded element.

12. The adaptable loupe supporting eyewear as recited in claim 10, said compression applying assembly ring further comprising a threaded end, said omni-directional loupe mount system further comprising an assembly ring fastener, said assembly ring fastener comprising a threaded surface adapted to engage with the threaded end of the compression applying assembly ring, wherein said engagement between said assembly ring fastener and said threaded end of said compression applying assembly ring assembles each loupe of said pair of loupes to a respective eyewear lens of said pair of eyewear lenses.

13. The adaptable loupe supporting eyewear as recited in claim 10, further comprising an eyewear lens positioning feature enabling each eyewear lens to be adjustably positioned within each lens rim to align each loupe with an associated eye of a user.

14. The adaptable loupe supporting eyewear as recited in claim 13, said eyewear lens positioning feature further comprising features restricting said adjustability of each eyewear lens to a generally transverse direction extending between a nasal side of said lens rim and a temple side of said lens rim.

15. The adaptable loupe supporting eyewear as recited in claim 10, further comprising an eyewear lens positioning feature comprising a slot and a protrusion combination, wherein one of said slot and said protrusion is integrated into said eyewear lens and said other of said slot and protrusion is integrated into said lens rim, wherein when assembled, said protrusion is inserted through said slot.

16. The adaptable loupe supporting eyewear as recited in claim 15, said eyewear lens positioning feature further comprising features restricting an adjustability of each lens,
 wherein each slot is defined by a major slot dimension and a minor slot dimension wherein said major slot dimension is larger than said minor slot dimension,
 wherein each protrusion extends across a span defining said minor slot dimension and each protrusion has a major protrusion dimension in a direction of said major slot dimension, wherein said major protrusion dimension is smaller than said major slot dimension,
 wherein said geometry restricts motion of said protrusion within said slot along said minor slot dimension, while enabling adjustability of said position of said protrusion within said slot along said major dimension of said slot.

17. The adaptable loupe supporting eyewear as recited in claim 10, further comprising an eyewear lens receiving recess formed in each lens rim of said pair of lens rims, wherein each lens receiving recess is shaped to receive and enable position adjustability of said associated eyewear lens.

18. The adaptable loupe supporting eyewear as recited in claim 10, further comprising at least one of a camera and a light emitting device assembled thereto.

19. An adaptable loupe supporting eyewear, said eyewear comprising:
 an eyewear assembly comprising a pair of lens rims joined together by a frame bridge and a pair of temples, each temple of said pair of temples extending rearward from a distal section of each respective lens rim;
 a pair of eyewear lenses, each eyewear lens carried by a respective lens rim of said pair of lens rims, each eyewear lens including a loupe receiving feature passing therethrough, wherein each loupe receiving feature is adapted to receive a loupe;
 a pair of loupes, each loupe comprising a loupe barrel and a series of loupe lenses adapted for magnification of an image of an object, said loupe barrel having a tubular structure defining a loupe lens supporting interior and an exterior surface, said exterior surface including a loupe attachment feature, wherein said series of loupe lenses is carried by said loupe lens supporting interior of each respective loupe, wherein each loupe attachment feature is assembled to said respective loupe receiving feature,
 each loupe attachment feature includes an omni-directional loupe mount system, the omni-directional loupe mount system comprising:
  a convex surfaced coupling ring carried at an attachment end of said loupe barrel, and
  a compression applying assembly ring having a concave loupe assembly ring inner surface,
  wherein said omni-directional loupe mount omni-directionally pivotally assembles each said loupe barrel to said respective eyewear lens of said pair of eyewear lenses,
  wherein said concave loupe assembly ring inner surface applies a compression force to said convex surfaced coupling ring, retaining said respective loupe in a fixed orientation, and
 a secondary eyewear subassembly comprising secondary eyewear frame carrying a pair of secondary eyewear lenses, wherein said secondary eyewear subassembly is detachably assembled to said eyewear assembly positioning said secondary eyewear subassembly on an interior side of said eyewear assembly.

20. The adaptable loupe supporting eyewear as recited in claim 19, wherein said pair of secondary eyewear lenses are prescription lenses.

\* \* \* \* \*